United States Patent
Watanabe et al.

(10) Patent No.: US 10,088,964 B2
(45) Date of Patent: Oct. 2, 2018

(54) DISPLAY DEVICE AND ELECTRONIC EQUIPMENT

(71) Applicant: Sharp Kabushiki Kaisha, Sakai, Osaka (JP)

(72) Inventors: Hisashi Watanabe, Sakai (JP); Tomohiro Kimura, Sakai (JP); Toshiki Matsuoka, Sakai (JP); Yasuhiro Sugita, Sakai (JP); Jean Mugiraneza, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/303,826

(22) PCT Filed: Apr. 10, 2015

(86) PCT No.: PCT/JP2015/061254
§ 371 (c)(1),
(2) Date: Oct. 13, 2016

(87) PCT Pub. No.: WO2015/159822
PCT Pub. Date: Oct. 22, 2015

(65) Prior Publication Data
US 2017/0212615 A1 Jul. 27, 2017

(30) Foreign Application Priority Data
Apr. 14, 2014 (JP) .................................. 2014-083200

(51) Int. Cl.
*G06F 3/045* (2006.01)
*G06F 3/044* (2006.01)

(52) U.S. Cl.
CPC .... *G06F 3/044* (2013.01); *G06F 2203/04101* (2013.01)

(58) Field of Classification Search
CPC .................. G06F 2203/04101; G06F 3/044
See application file for complete search history.

(56) References Cited

U.S. PATENT DOCUMENTS

| | | | |
|---|---|---|---|
| 8,325,150 B1 | 12/2012 | Reeves et al. | |
| 2008/0309631 A1* | 12/2008 | Westerman | G06F 1/3203 345/173 |

(Continued)

FOREIGN PATENT DOCUMENTS

| | | |
|---|---|---|
| CN | 101968694 A | 2/2011 |
| JP | 2012-175642 A | 9/2012 |

(Continued)

OTHER PUBLICATIONS

Official Communication issued in International Patent Application No. PCT/JP2015/061254, dated May 19, 2015.

*Primary Examiner* — Mark Edwards
(74) *Attorney, Agent, or Firm* — Keating & Bennett, LLP

(57) ABSTRACT

A display device (1) is provided that includes a display panel having a display region P; a transparent cover (16) having a top surface parallel to a surface for displaying the image, and a side surface connected to the top surface; a touch panel; and a case (17) for housing the display panel and the touch panel. The touch panel is capable of sensing contact or approach of an object at at least a part of an outer peripheral line of the top surface of the transparent cover (16). At the part of the outer peripheral line of the transparent cover (16), at which contact or approach of an object can be sensed by the touch panel, a part of the outer peripheral line that is recessed inward or is protruded outward is formed as a deformed part (16a).

10 Claims, 22 Drawing Sheets

(56) References Cited

U.S. PATENT DOCUMENTS

| | | |
|---|---|---|
| 2010/0238119 A1 | 9/2010 | Dubrovsky et al. |
| 2010/0315356 A1 | 12/2010 | Ferren et al. |
| 2011/0109535 A1 | 5/2011 | Watanabe et al. |
| 2013/0096387 A1 | 4/2013 | DeRidder et al. |
| 2013/0201136 A1* | 8/2013 | Baard ............... G06F 3/041 345/173 |
| 2013/0242505 A1* | 9/2013 | Nguyen ............. G06F 1/1626 361/679.55 |
| 2015/0070308 A1* | 3/2015 | Takizawa .......... G06F 3/04886 345/174 |

FOREIGN PATENT DOCUMENTS

| | | | | |
|---|---|---|---|---|
| JP | 2013-161141 A | 8/2013 | | |
| JP | 2014-35754 A | 2/2014 | | |
| JP | 2015055938 A | * 3/2015 | ......... | G06F 3/04886 |
| WO | 2009/157150 A1 | 12/2009 | | |

* cited by examiner

DISPLAY DEVICE AND ELECTRONIC EQUIPMENT

TECHNICAL FIELD

The present disclosure relates to a technique for sensing contact or approach of an object in a display device having a touch panel.

BACKGROUND ART

In a display device such as a smartphone or a tablet, a touch panel is provided. This allows a user to make an operation by lightly touching a screen of the display device equipped with the touch panel. The user, however, sometimes touches a part that he/she did not intend to touch during an operation, thereby making an input error. The user therefore has to gaze the screen while making an operation.

As a technique for facilitating operations of a user, for example, a cover attached to a portable device equipped with a touch screen is described in Patent Document 1 indicated below. This cover has an opening or a button, and is attached at such a position that the same covers at least a part of a user interface of the portable device.

Further, Patent Document 2 indicated below discloses an external cover for a tablet smartphone equipped with a touch screen. The document discloses that a keyboard is formed on this external cover, and this keyboard is caused to correspond to a virtual keyboard displayed on the touch screen.

PRIOR ART DOCUMENT

Patent Document

Patent Document 1: U.S. Pat. No. 8,325,150
Patent Document 2: US 2010/0238119 A

SUMMARY OF THE INVENTION

Problem to be Solved by the Invention

In the prior art techniques described above, the operation position and the input mode when a user makes an operation are fixed. The technique therefore does not correspond to a wide variety of operation methods. The present application discloses a display device that is capable of facilitating operations while making a user's operation mode flexible.

Means to Solve the Problem

A display device of the present disclosure includes: a display panel having a display region for displaying an image; a transparent cover provided so as to be superposed on the display region, the transparent cover having a top surface parallel to a surface for displaying the image, and a side surface connected to the top surface; a touch panel for sensing contact or approach of an object with respect to the transparent cover; and a case for housing the display panel and the touch panel. The touch panel is capable of sensing contact or approach of an object at at least a part of an outer peripheral line that is a boundary line between the top surface and the side surface in the outer periphery of the top surface of the transparent cover. At the part of the outer peripheral line of the transparent cover, at which contact or approach of an object can be sensed by the touch panel, a part of the outer peripheral line that is recessed inward or is protruded outward is formed as a deformed part.

Effect of the Invention

According to the present disclosure, it is possible to realize a display device that facilitates operations, while making a user's operation mode flexible.

BRIEF DESCRIPTION OF DRAWINGS

FIG. 23A illustrates an exemplary display of an image according to a contact of a finger sensed by the deformed part 16a.

FIG. 23B illustrates an exemplary display of an image according to a contact of a finger sensed by the deformed part 16a.

FIG. 23C illustrates an exemplary display of an image according to a contact of a finger sensed by the deformed part 16a.

FIG. 36 illustrates an example of a case where the cursor position is changed according to a motion of an object in an internal area of the deformed part 16a.

MODE FOR CARRYING OUT THE INVENTION

Figure 1:
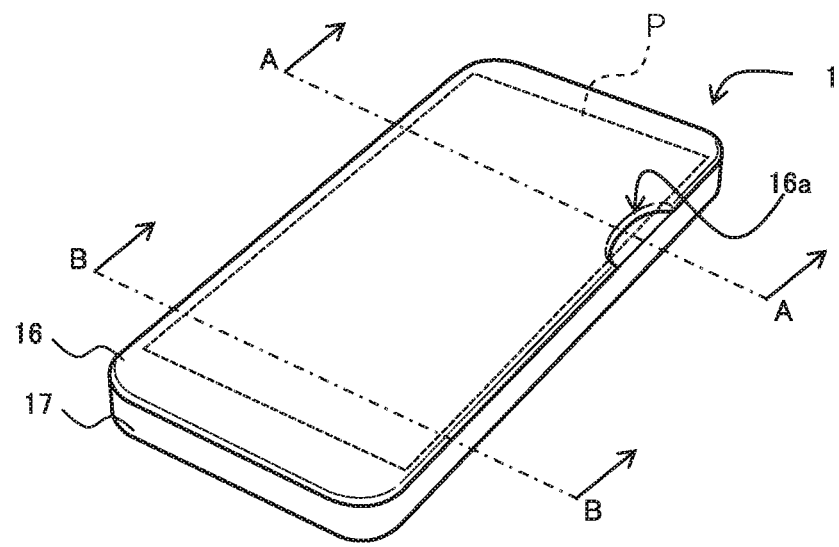
FIG. 1 is a perspective view of a display device 1 in Embodiment 1.

A display device according to one embodiment of the present invention includes: a display panel having a display region for displaying an image; a transparent cover provided so as to be superposed on the display region, the transparent cover having a top surface parallel to a surface for displaying the image, and a side surface connected to the top surface; a touch panel for sensing contact or approach of an object with respect to the transparent cover; and a case for housing the display panel and the touch panel. The touch panel is capable of sensing contact or approach of an object at at least a part of an outer peripheral line that is a boundary line between the top surface and the side surface in the outer periphery of the top surface of the transparent cover. At the part of the outer peripheral line of the transparent cover, at which contact or approach of an object can be sensed by the touch panel, a part of the outer peripheral line that is recessed inward or is protruded outward is formed as a deformed part. This exemplary configuration of the display device is referred to as the first configuration.

In the first configuration, a user is allowed to operate the display device by bringing a finger or an indicating instrument such as a pen into contact with, or close to, the deformed part of the transparent cover. Here, the user can easily specify the position of the deformed part of the transparent cover without gazing the display screen. The user therefore can easily operate the display device by using the deformed part of the end of the transparent cover. Further, the touch panel is capable of detecting the position and the motion of the object at the deformed part. This makes it possible to sense a variety of actions such as an action of touching a part of the deformed part, and an action of moving a finger in a specific direction along the deformed part, via the deformed part. Consequently, this allows the user's operation mode to be flexible.

The first configuration described above may be such that the touch panel includes a plurality of first electrodes and a plurality of second electrodes that are provided so as to be superposed on the transparent cover, and senses contact or approach of an object with respect to the transparent cover by detecting capacitances between the first electrodes and the second electrodes. A shape or a pitch of the first electrodes and the second electrodes for detecting contact or approach of an object in the deformed part can be made different from a shape or a pitch of the first electrodes and the second electrodes in another part. This provides an electrode configuration that enables appropriate sensing of contact or approach of an object in each of the deformed part and another area.

The first configuration described above may further include a display control unit for controlling an image displayed on the display panel, based on the contact or approach of the object sensed by the touch panel. The display control unit allows an image corresponding to the contact or approach of the object sensed at the deformed part of the transparent cover to be displayed at a portion of the display region corresponding to the deformed part. This allows a user to easily recognize effects of the operation with respect to the deformed part. Further, the flexibility of the user's operation mode can be further improved.

A display device according to one embodiment of the present invention includes: a display panel having a display region for displaying an image; a transparent cover provided so as to be superposed on the display region; and a touch panel that includes a plurality of first electrodes and a plurality of second electrodes that are provided so as to be superposed on the transparent cover, and senses contact or approach of an object with respect to the transparent cover by detecting capacitances between the first electrodes and the second electrodes. The transparent cover has a top surface parallel to a surface for displaying the image, and a side surface connected to the top surface. The display device includes a deformed part that is formed with a part of an outer peripheral line that is a boundary line between the top surface and the side surface in the outer periphery of the top surface of the transparent cover, the deformed part being the part of the outer peripheral line recessed inward or protruding outward, or alternatively, that is formed with an inner peripheral line that is a boundary line between the top surface and the side surface, the inner peripheral line being provided on an inner side to the outer peripheral line of the top surface. A shape or a pitch of the first electrodes and the second electrodes for sensing contact or approach of an object in the deformed part is different from a shape or a pitch of the first electrodes and the second electrodes in another part. This exemplary configuration of the display device is referred to as the second configuration.

In the second configuration, on the transparent cover, in the deformed part formed on a part of the boundary line between the top surface and the side surface, a user's operation can be accurately sensed. The user is allowed to operate the display device by bringing a finger or an indicating instrument into contact with, or close to, the deformed part. The user, therefore, is allowed to specify the operation position without gazing the display screen, thereby being allowed to perform the operation easily. Further, a variety of actions with respect to the deformed part can be sensed with high accuracy, which makes the user's operation mode flexible.

A display device according to one embodiment of the present invention includes: a display panel having a display region for displaying an image; a transparent cover provided so as to be superposed on the display region; a touch panel that includes a plurality of first electrodes and a plurality of second electrodes that are provided so as to be superposed on the transparent cover, and senses contact or approach of an object with respect to the transparent cover by detecting capacitances between the first electrodes and the second electrodes; and a display control unit for controlling an image displayed on the display panel, based on the contact or approach of the object sensed by the touch panel. The transparent cover has a top surface parallel to a surface for displaying the image, and a side surface that is not parallel to the top surface. The display device includes a deformed part that is formed with a part of an outer peripheral line that is a boundary line between the top surface and the side surface in the outer periphery of the top surface of the transparent cover, the deformed part being the part of the outer peripheral line recessed inward or protruding outward, or alternatively, a deformed part that is formed with an inner peripheral line that is a boundary line between the top surface and the side surface, the inner peripheral line being provided on an inner side to the outer peripheral line of the top surface. The display control unit allows an image corresponding to the contact or approach of the object sensed at the deformed part of the transparent cover to be displayed at a portion of the display region corresponding to the deformed part. This exemplary configuration of the display device is referred to as the third configuration.

In the third configuration, on the transparent cover, a user's operation at the deformed part formed in a part of a boundary line between the top surface and the side surface can be sensed. Further, the display on the portion corresponding to the deformed part can be controlled according to the user's operation at the deformed part. This allows the user to perform the operation easily. Further, this enables sensing of a variety of actions with respect to the deformed part, thereby enabling display control according to the action. This makes the user's operation mode flexible.

The side surface of the transparent cover in the second and third configurations described above may be a side surface that is connected to an outer peripheral line that forms an outer periphery of the top surface, or alternatively, a side surface that is connected to an inner peripheral line that forms an inner periphery of the top surface. For example, a side surface on a recessed portion or a projected portion formed so as to be surrounded by the top surface of the transparent cover is one configuration of a side surface of the transparent cover.

In any one of the first to third configurations described above, the portion corresponding to the deformed part of the transparent cover of the case can be formed so as to be recessed inward or protruded outward along the shape of the deformed part. This makes it possible to change the shape of the display device so as to be along the deformed part. This allows a user to further easily recognize the position of the deformed part.

In any one of the first to third configurations, the side surface of the transparent cover can be formed with a curved surface. This allows the user to perform an operation with respect to the deformed part easily. Further, this enables control of the direction of light emitted from the display region. For example, an image on the display region can be enlarged and shown to a user.

In any one of the above-described first to third configurations, the transparent cover can be formed to be removable. This allows a user to select the presence/absence of inputting function using the deformed part of the transparent cover.

The above-described touch panel can be configured so that, when the transparent cover is attached, the touch panel detects the attachment of the transparent cover and a position of the deformed part. This allows the display device to automatically recognize the position of the deformed part of the transparent cover, and causes the deformed part to shift to a state of detecting an operation with respect to the deformed part. This reduces operation loads on a user.

Any one of the first to third configurations described above may be such that the deformed part is formed at only one portion of the outer periphery of the top surface of the transparent cover. In this case, a user can easily recognize the position of the deformed part.

The embodiments of the present invention encompass electronic equipment that incorporates the display device according to any one of the first to third configurations.

The following describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simplified or schematically illustrated, or a part of constituent members are omitted. Further, the dimension ratios of the constituent members illustrated in the drawings do not necessarily indicate the real dimension ratios.

Embodiment 1

(Exemplary Configuration of Display Device 1)

Figure 2:
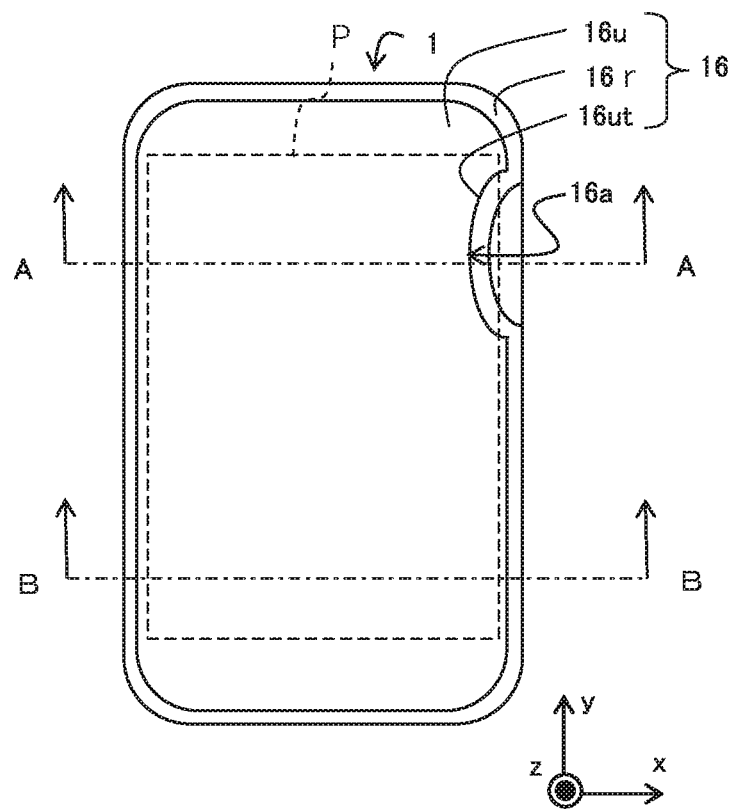
FIG. 2 is a plan view of the display device 1 illustrated in FIG. 1.
Figure 3A:
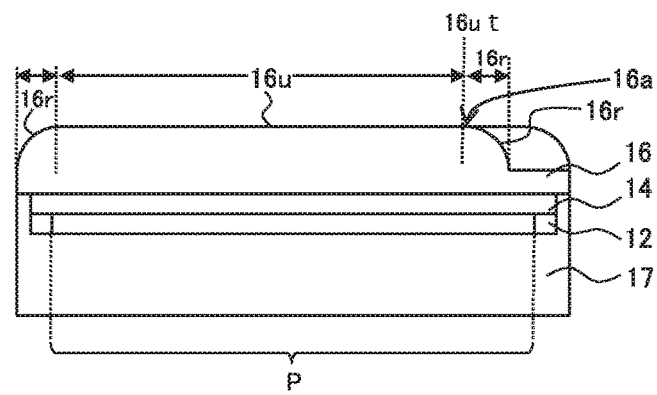
FIG. 3A is a cross-sectional view of the display device 1 illustrated in FIGS. 1 and 2 taken along line A-A.
Figure 3B:
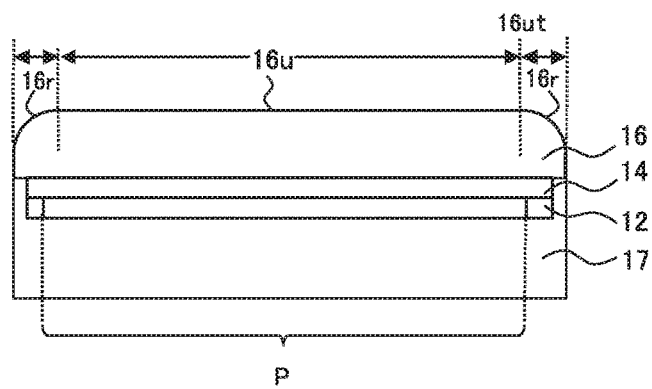
FIG. 3B is a cross-sectional view of the display device 1 illustrated in FIGS. 1 and 2 taken along line B-B.

FIG. 1 is a perspective view of a display device 1 according to Embodiment 1. FIG. 2 is a plan view of the display device 1 illustrated in FIG. 1. FIG. 3A is a cross-sectional view of the display device 1 illustrated in FIGS. 1 and 2 taken along line A-A. FIG. 3B is a cross-sectional view of the display device 1 illustrated in FIGS. 1 and 2 taken along line B-B.

As illustrated in FIG. 1, the display device 1 includes a case 17 that houses a display panel and a touch panel, and a transparent cover (translucent cover) 16 that covers a surface on which an image is displayed. In FIGS. 1 and 2, a display region P on the display panel is illustrated with dotted lines. The display region P is an area where pixels for displaying an image are arranged. The transparent cover 16 is provided so as to be superposed on the display region P. The transparent cover 16 has a top surface 16$u$ that is parallel to a display surface of an image displayed in the display region P.

As illustrated in FIGS. 1 and 2, a part (16$a$) of an outer peripheral line 16$ut$ that forms an outer periphery of the top surface 16u of the transparent cover 16 is recessed inward, when viewed in a direction vertical to the top surface (in the z direction) (that is, in plan view). Here, the outer peripheral line 16ut is a boundary line between the top surface 16u and a side surface 16r in the outer periphery of the top surface 16u. The side surface 16r is formed with a surface that is not parallel to the top surface 16u. This inward-recessed part (16a) of the outer peripheral line 16ut of the transparent cover 16 is referred to as a deformed part 16a. In this example, the deformed part 16a is formed as a recessed portion that is a part of the outer peripheral line 16ut of the top surface 16u of the transparent cover 16, the recessed portion being dented inward; alternatively, the deformed part 16a may be formed as a protruded portion that is a part of the outer peripheral line 16ut of the top surface 16u of the transparent cover 16, the protruded portion being protruded outward.

In the example illustrated in FIGS. 1 and 2, the deformed part 16a is formed so as to overlap the display region P in plan view. In other words, the deformed part 16a is formed in such a manner that the outer peripheral line 16ut of the top surface 16u of the transparent cover 16 extends to both of the display region P and the frame region outside the display region P. In contrast, the deformed part 16a may be formed so that the display region P does not overlap the deformed part 16a. For example, a part of the outer peripheral line of the display region P may be recessed inward, or may be protruded outward, along the shape of the deformed part 16a. The deformed part 16a may be provided on any of the edges of the top surface 16u of the transparent cover 16. Further, in this example, only one deformed part 16a is provided, but alternatively, a plurality of the deformed parts 16a can be provided.

In the exemplary configuration illustrated in FIGS. 3A and 3B, the touch panel 14 and the transparent cover 16 are laminated on the image display surface of the display panel 12 in the stated order. In other words, the touch panel 14 is provided between the display panel 12 and the transparent cover 16, so as to be superposed on the display region P. The display panel 12 and the touch panel 14 are supported by the case 17. Though not illustrated in the drawings, a backlight can be provided on a surface on a side opposite to the image display surface of the display panel 12. Further, between the display panel 12 and the touch panel 14, and between the touch panel 14 and the transparent cover 16, transparent adhesive layers may be provided. Still further, the case 17 may incorporate components required to compose a CPU, a memory, a camera module, a communication module, an antenna, a battery, and other equipment.

The display panel 12 can be formed with, for example, a liquid crystal panel. The liquid crystal panel includes an active matrix substrate, a counter substrate, and a liquid crystal layer interposed between the active matrix substrate and the counter substrate.

The touch panel 14 senses contact or approach of an object with respect to the transparent cover 16. More specifically, the touch panel 14 senses contact or approach of an object with respect to at least a part of the top surface 16u of the transparent cover 16 and the outer peripheral line 16ut forming the outer periphery of the top surface 16u. The touch panel 14 can be formed with a transparent substrate formed with a resin or glass, and a plurality of electrode pads formed on the substrate. In this configuration, the touch panel 14 includes circuits that detect capacitances between electrode pads on the substrate. The touch panel 14 can specify the position on the transparent cover 16 that the object is in contact with or approaches, based on changes in the capacitances thus detected. By arranging electrode pads so that capacitances are generated also on the outer peripheral line 16ut of the top surface 16u of the transparent cover 16, the sensing of an object on the outer peripheral line 16ut is enabled. A specific example is to be described below. It should be noted that the touch panel 14 is not limited to such a configuration based on the electrostatic capacitance system.

The transparent cover 16 can be formed with a material that transmits light, for example, a resin or glass. In the example illustrated in FIGS. 3A and 3B, a side surface (end face) 16r connected to the top surface 16u is formed with a curved surface. In this way, by forming the end face in a curved surface shape, edges of ends of the transparent cover 16, that is, edges of portions in which the top surface 16u and the side surface 16r are connected, can be made smooth. Further, the edge of the end portion of the transparent cover 16 is exposed out of the case. In this way, the configuration may be such that at least a part of the side surface 16r of the transparent cover 16 is exposed so that contact or approach of an object with respect to the exposed part is sensed by the touch panel 14. This configuration allows a user to operate the display device 1 by an action of contacting the edge of the end portion of the transparent cover 16, or an action of sliding the finger along the edge. Particularly, by exposing the side surface 16r of the deformed part 16a, the operability can be improved further.

Besides, by forming the side surface 16r connected to the top surface 16u of the transparent cover 16 with a curved surface, the transparent cover 16 can be formed into a lens. For example, the direction in which light emitted from the display region P of the display panel 12 progresses is changed at the side surface 16r. In the above-described example, the entirety of the side surface 16r connected to the top surface 16u of the transparent cover 16 is formed with a curved surface, but the configuration may be such that a part of the side surface 16r connected to the end of the top surface 16u may be formed with a curved surface. For example, only the side surface 16r of the deformed part 16a can be formed with a curved surface.

As illustrated in FIG. 3A, in the side surface 16r connected to the top surface 16u of the transparent cover 16 in the deformed part 16a, the transparent cover 16 is formed so that the thickness thereof decreases as it goes outward. In this way, in the deformed part 16a, the thickness of the transparent cover 16 in the area of the top surface 16u and that in the area outside the top surface 16u are made different, whereby the detection accuracy or the detected capacitance value of the touch panel 14 in the top surface 16u area and those outside the top surface 16u area can be made different. This makes the following possible in the touch panel 14, for example: automatically detecting the position of the deformed part 16a; and setting the detection accuracy in the deformed part 16a higher than in other parts.

In the example illustrated in FIG. 3A, in the deformed part 16a, the position of the outer peripheral line 16ut of the top surface 16u of the transparent cover 16 is on an inner side, as compared with the position of the outer peripheral line 16ut illustrated in FIG. 3B. Further, the outer peripheral line 16ut of the deformed part 16a is formed at such a position that the outer peripheral line 16ut overlaps the display region P, that is, at a position inside the display region P. In other words, the deformed part 16a can be formed by providing a step in the transparent cover 16 inside the display region P. Contact or approach of an object to a portion of the transparent cover 16 that covers the display region P is sensed by the touch panel 14. Contact or approach of an object with respect to the deformed part 16a inside the display region P is also sensed by the touch panel 14. It should be noted that in the example illustrated in FIG. 3A, the transparent cover 16 is formed so as to extend from the side surface 16r of the deformed part 16a to the end (surface) of the case 17. With this, the touch panel 14 and the case 17 outside the deformed part 16a are covered with the transparent cover 16.

(Detailed Exemplary Configuration of Transparent Cover End)

Figure 4:
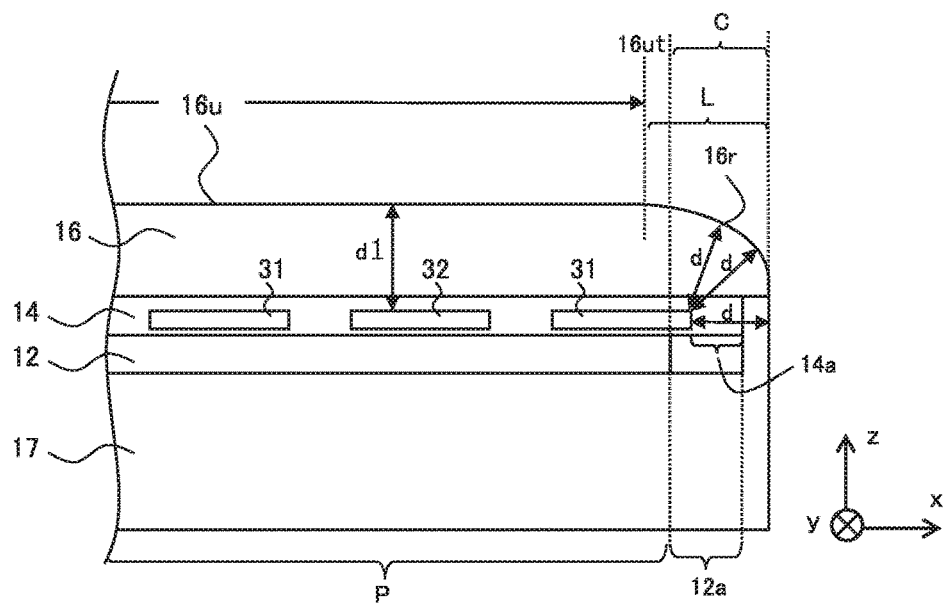
FIG. 4 is a view obtained by enlarging a part of the cross section illustrated in FIG. 3B.

FIG. 4 is an enlarged view of a part of the cross section illustrated in FIG. 3B. In the example illustrated in FIG. 4, the touch panel 14 includes first electrode pads 31 and second electrode pads 32 as electrode groups for sensing contact or approach of an object. Either of the first electrode pads 31 and the second electrode pads 32 can be used as drive electrodes to which a driving voltage is applied, and the other of the same can be used as detection electrodes for detecting a capacitance value.

In a frame region C outside the display region P, between the second electrode pads 31 arranged along outer edges of the touch panel 14 and the case 17, there is provided a first line housing part 14a in which various types of lines are arranged. Between the display region P of the display panel 12 and the case 17, there is provided a second line housing part 12a in which various types of lines are arranged.

The distance d between outer sides of the display region P, that is, surfaces of the case 17 or the transparent cover 16 in the frame region C illustrated in FIG. 4, and the electrode pads 31 arranged along the outer edges of the touch panel 14, can be set to be equal to or smaller than a sensable distance at which an object can be detected by the touch panel 14. The sensable distance is a distance at which the presence of an object can be sensed by the touch panel 14. This makes it possible to sense contact or approach of an object with respect to the surface of the display device 1 outside the display region P.

Further, the above-described distance d can be set to be equal to or smaller than a distance d1 in the direction vertical to the display panel 12 between the touch panel 14 (more specifically the first electrode pads 31 and the second electrode pads 32) and the top surface 16u of the transparent cover 16. This makes it possible to more surely sense contact or approach of an object with respect to the surface of the display device 1 outside the display region P.

Figure 5:
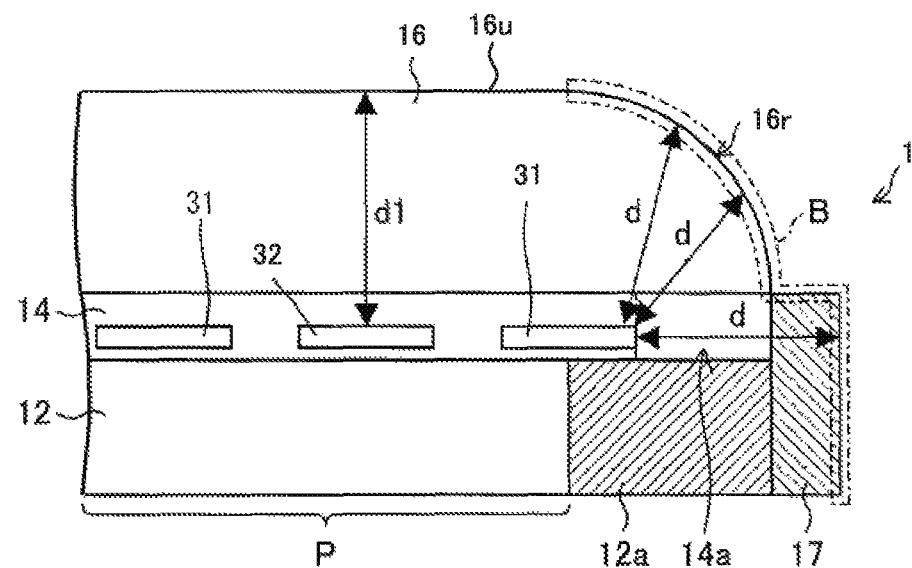
FIG. 5 is a cross-sectional view illustrating a modification example of a case 17 and a transparent cover 16.

The configuration of the case 17 and the transparent cover 16 is not limited to the example illustrated in FIG. 4. FIG. 5 is a cross-sectional view illustrating a modification example of the case the transparent cover 16. For example, in the example illustrated in FIG. 4, the transparent cover 16 is formed to extend to an end face of the case 17, but the configuration may be such that the transparent cover 16 is arranged inside the case 17, as illustrated in FIG. 5. In this case as well, the distance d between the electrode pads 31, the surface of the transparent cover 16 or the case 17 on an outer side with respect to the display region P, that is, the surface of the display device 1 in the area B illustrated in FIG. 5, can be set to be equal to or smaller than the sensable distance, or equal to or less than the distance d1.

Figure 6:
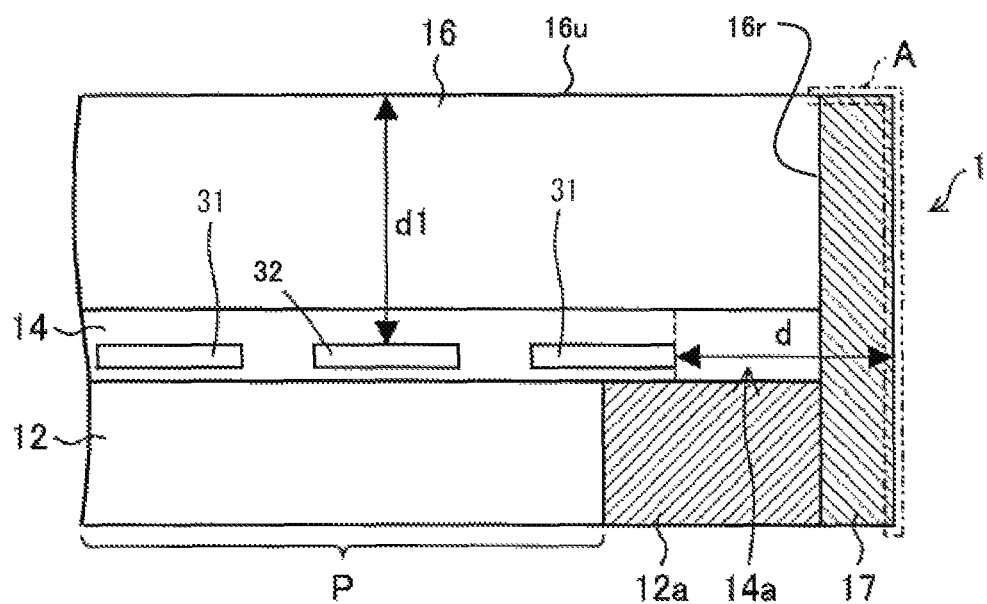
FIG. 6 is a cross-sectional view illustrating another modification example of the case 17 and the transparent cover 16.

FIG. 6 is a cross-sectional view illustrating another modification example of the case 17 and the transparent cover 16. In the example illustrated in FIG. 6, a side surface 16r connected to the outer periphery of the top surface 16u of the transparent cover 16 is not a curved surface, but a flat surface vertical to the display surface. Further, the side surface 16r connected to the top surface 16u of the transparent cover 16 is supported by the case 17. In this case, the distance d between the electrode pads 31 provided along the outer edge of the touch panel 14, and the surface of the case 17 on an outer side with respect to the display region P (i.e., the area A illustrated in FIG. 6), can be set to be equal to or smaller than the sensable distance or the distance d1.

The configuration that enables the sensing of contact or approach of an object at the end of the transparent cover 16, however, is not limited to the above-described example. For example, the configuration may be such that, in addition to the electrode pad group provided so as to be superposed on the display region P, an electrode pad group is arranged along an end of the transparent cover 16, and the capacitances between the electrode pads are detected.

In the example illustrated in FIGS. 4 to 6, from the viewpoint of the detection function by the touch panel 14 at the end of the display device 1, the configuration of the end of the display device 1 is designed. In addition to this configuration, the shape of the end of the transparent cover 16 can be designed as described below. The example described below is based on an intension of designing the configuration of the end of the display device 1 from the viewpoint of the display performance in the frame region.

As illustrated in FIG. 4, the transparent cover 16 includes a lens part L that is arranged so as to straddle over a boundary between the display region P and the frame region C on an outer side to the display region P. In this example, the lens part L is formed by forming the side surface 16r connected to the top surface 16u of the transparent cover 16 into a curved surface shape. The boundary between the display region P and the frame region C on the outer side thereto extends in the y direction (first direction). The lens part L causes a part of the light emitted from the display region P to be refracted toward the frame region C side, so as to make the frame region C hardly visible, whereby an image can be displayed to an end of the case. Further, an intersection line at which a plane vertical to the y direction and the viewer-side surface of the lens part L, that is, the side surface 16r intersect is made a curve that is not a circular arc, whereby the lens part L refracts light so that pitches of light emitted from a plurality of pixels in the display region P on the plane vertical to the y direction are approximately equal to one another, whereby deformation of images displayed can be reduced.

Figure 7:
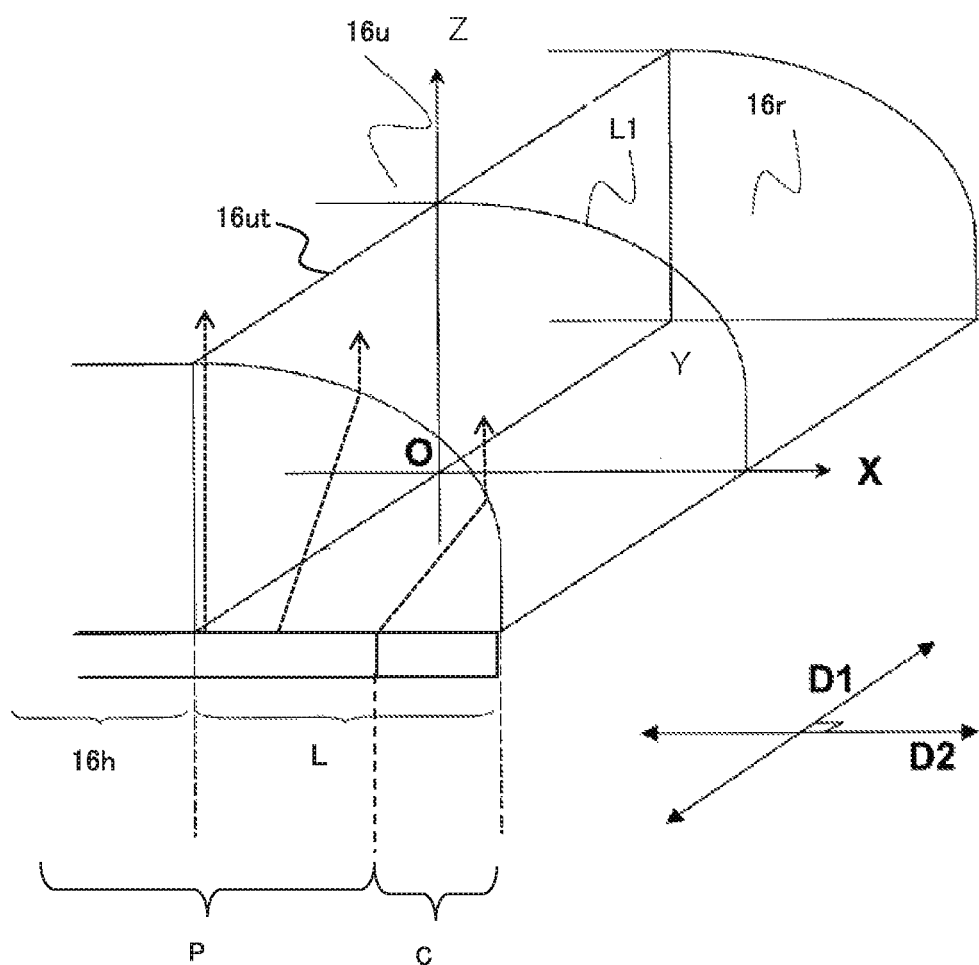
FIG. 7 is a perspective view of the transparent cover 16.

FIG. 7 is a perspective view of the transparent cover 16. As illustrated in FIG. 7, the intersection line L1 at which the viewer-side surface 16r of the lens part L, that is, the side surface 16r and the plane vertical to the first direction (D1) intersect is a curve that is not a circular arc.

The lens part L has a ridgeline that extends in the first direction D1. Here, the direction in which the ridgeline extends is made approximately perpendicular to the pixel array in the display panel 12, that is, the color filter lines, whereby the occurrence of moire can be suppressed.

Here, the part covered by the top surface 16u of the transparent cover 16 is referred to as a plate part 16h. An area of the display region P covered by the plate part 16h is referred to as a center display region, and an area covered by the lens part L is referred to as a peripheral display region. The viewer-side surface of the plate part 16h is the top surface 16u, and is approximately parallel to the display surface of the display panel 12. Light that is emitted from pixels arrayed in the center display region and enters the plate part 16h travels in the plate part 16h in a direction vertical to the display surface of the display panel 12, thereby becoming emitted to the viewer side.

Light emitted from the peripheral display region of the display panel 12 enters the lens part L, and is emitted, in the frame region C, from the lens part L toward the viewer side.

The light emitted from the lens part L is refracted in a direction vertical to the display surface. In this way, the light emitted from the peripheral display region of the display panel 12 is refracted, whereby an image is displayed on the front surface of the frame region C. This therefore makes the frame region C hardly visible.

(Modification Example of Transparent Cover)

Figure 8A:
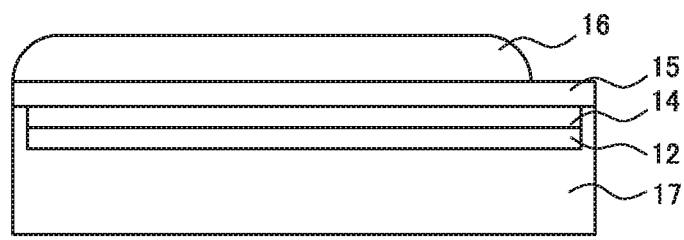
FIG. 8A is a cross-sectional view illustrating an exemplary configuration of the display device 1 including a removable transparent cover 16.
Figure 8B:
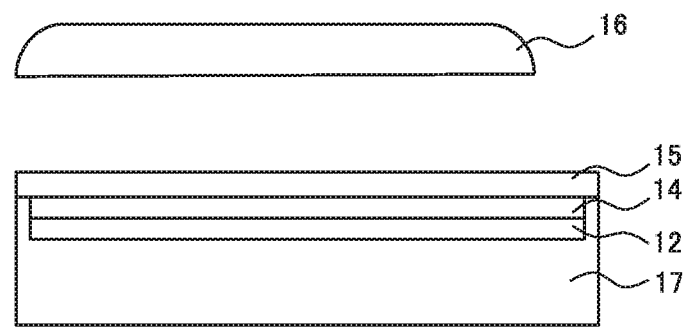
FIG. 8B illustrates a state of the configuration illustrated in FIG. 8A in which the transparent cover 16 is removed.

The transparent cover 16 can be removable. FIG. 8A is a cross-sectional view illustrating an exemplary configuration of the display device 1 in a case where the transparent cover 16 is removable. FIG. 8B illustrates a state in which the transparent cover 16 is removed in the configuration illustrated in FIG. 8A. In the example illustrated in FIG. 8A, a front plate 15 that covers the display panel 12 and the touch panel 14 is further provided. The front plate 15 is formed with a transparent member, and is provided so as to be superposed on the display region P of the display panel 12. The transparent cover 16 is removable from the front plate 15. In this example, the front plate 15 also functions to protect the touch panel 14 and the display panel 12. As a material for forming the front plate 15, for example, a transparent resin or a tempered glass such as acryl or polycarbonate is used.

The transparent cover 16 can be fastened to the case 17 with a claw structure, an adhesive (not illustrated), or the like, so that the transparent cover 16 does not move when it is attached. Further, the configuration may be such that the shape of the transparent cover 16 attached is recognized by the touch panel 14. When the transparent cover 16 is attached to the front plate 15, capacitances of a portion on which the transparent cover 16 is mounted change. The touch panel 14 detects these changes of capacitances, thereby recognizing the shape of the transparent cover 16.

For example, the display device 1 records, in a memory, the distribution of capacitance values measured by the touch panel 14 in a state in which the transparent cover 16 is not attached. When it is detected that the transparent cover 16 is attached, a central processing unit (CPU) of the display device 1 instructs the touch panel 14 to recognize the shape of the transparent cover 16. In a state where the transparent cover 16 is attached, the touch panel 14 measures the distribution of the capacitance values. The CPU calculates a difference between the distribution of the capacitance values measured in a state in which the transparent cover 16 is attached, and the distribution of the capacitance values recorded in the memory. The CPU is capable of deciding the position of the deformed part based on the calculated difference. The CPU is capable of, for example, automatically switching the setting of an application executed by the display device 1, to a setting that permits input to the deformed part by touching. In this way, the display device 1 automatically recognizes the shape of the transparent cover 16 and automatically updates the operation setting of an application program executed by the display device, whereby loads on a user can be reduced.

Embodiment 2

Figure 9:
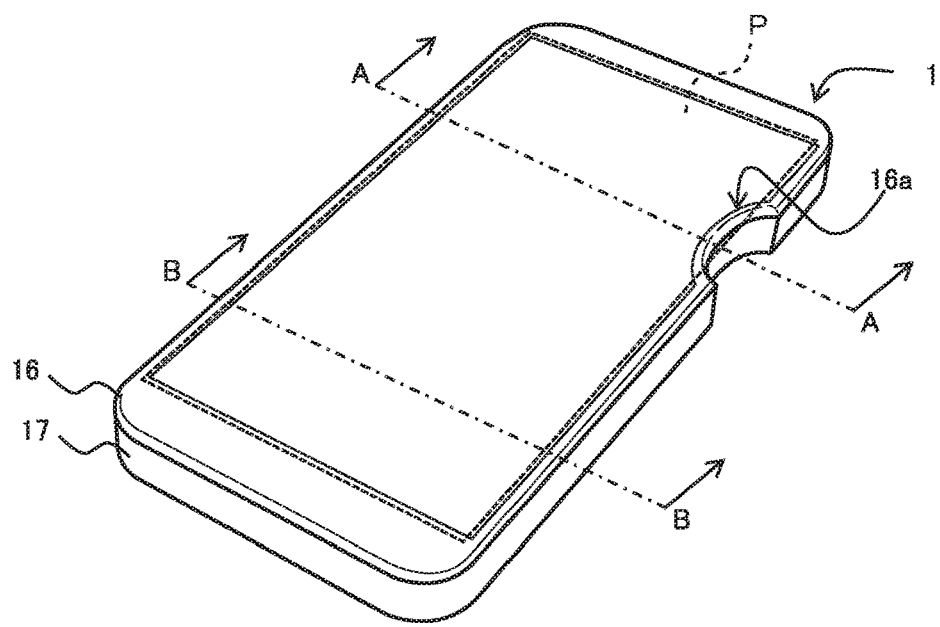
FIG. 9 is a perspective view of a display device 1 according to Embodiment 2.
Figure 10:
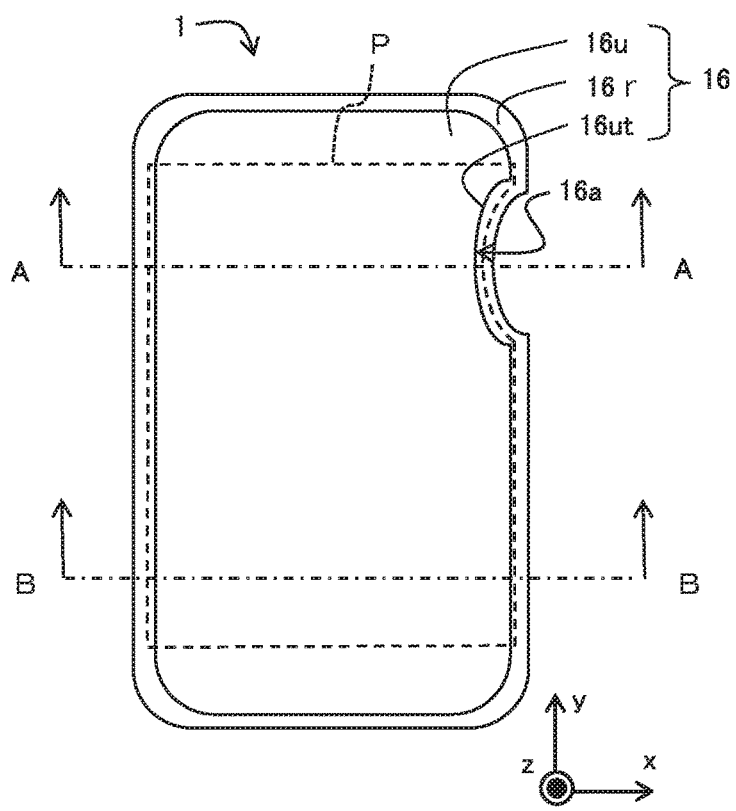
FIG. 10 is a plan view of the display device 1 illustrated in FIG. 9.
Figure 11A:
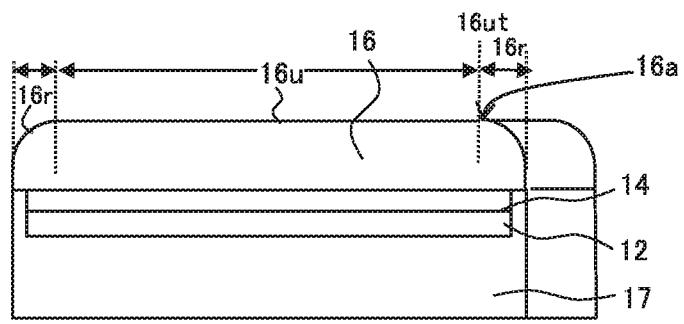
FIG. 11A is a cross-sectional view of the display device 1 illustrated in FIGS. 9 and 10 taken along line A-A.
Figure 11B:
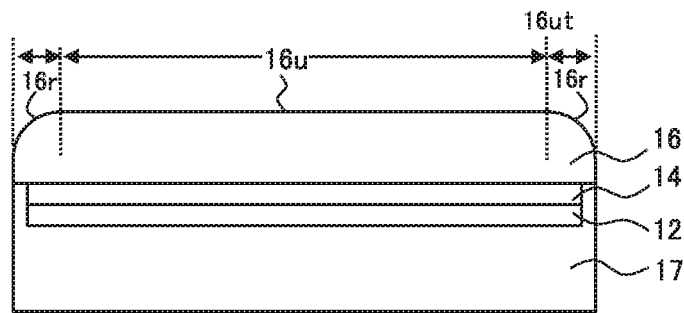
FIG. 11B is a cross-sectional view of the display device 1 illustrated in FIGS. 9 and 10 taken along line B-B.

FIG. 9 is a perspective view of a display device 1 according to Embodiment 2. FIG. 10 is a plan view of the display device 1 illustrated in FIG. 9. FIG. 11A is a cross-sectional view of the display device 1 illustrated in FIGS. 9 and 10 taken along line A-A. FIG. 11B is a cross-sectional view of the display device 1 illustrated in FIGS. 9 and 10 taken along line B-B. Configurations other than the configuration according to Embodiment 2 described below may be identical to the configurations of Embodiment 1.

In the example illustrated in FIGS. 9, 10, 11A, and 11B, a part corresponding to the deformed part 16a of the transparent cover 16 of the case 17 is recessed inward along the shape of the deformed part 16a. The shape of the display device 1 when viewed in a direction vertical to the display surface is the same as the shape of the transparent cover 16. In other words, in plan view, the shape of the case 17 and the shape of the transparent cover 16 are the same.

In the example illustrated in FIGS. 9, 10, 11A, and 11B, the display region P of the display panel 12 has a shape recessed along the shape of the display device 1. In other words, the display region P is recessed inward along the shape of the deformed part 16a. This allows the display region P to have a shape formed along the ends of the case 17, thereby making it possible to reduce the size of the frame region. The display region P, however, does not necessarily have a shape formed along the shape of the deformed part 16a, and for example, may have a rectangular shape (a specific example of the same is described below with reference to FIGS. 13 to 16).

The touch panel 14 can have a shape formed along the transparent cover 16. For example, the outer edges of the touch panel 14 can be formed along the display region P illustrated in FIG. 10 with broken lines. As a specific example, the electrode pads of the touch panel 14 may be arranged in the same area as that of the display region P. This allows the touch panel 14 to be formed along the shape of the outer edges of the transparent cover 16. This makes it possible to keep the distance between the ends of the transparent cover 16 and the electrode pads of the touch panel 14 in a uniform range, thereby keeping the detection accuracy at the ends. For example, the electrode pads of the touch panel 14 may be separated from the edge of the outer peripheral line 16ut of the top surface 16u of the transparent cover 16, whereby the sensitivity is prevented from lowering extremely. In a case where, for example, the sensitivity lowering is in a tolerable range, the touch panel 14 can be formed, not along the shape of the transparent cover 16, but into a rectangular shape, for example.

Figure 12:
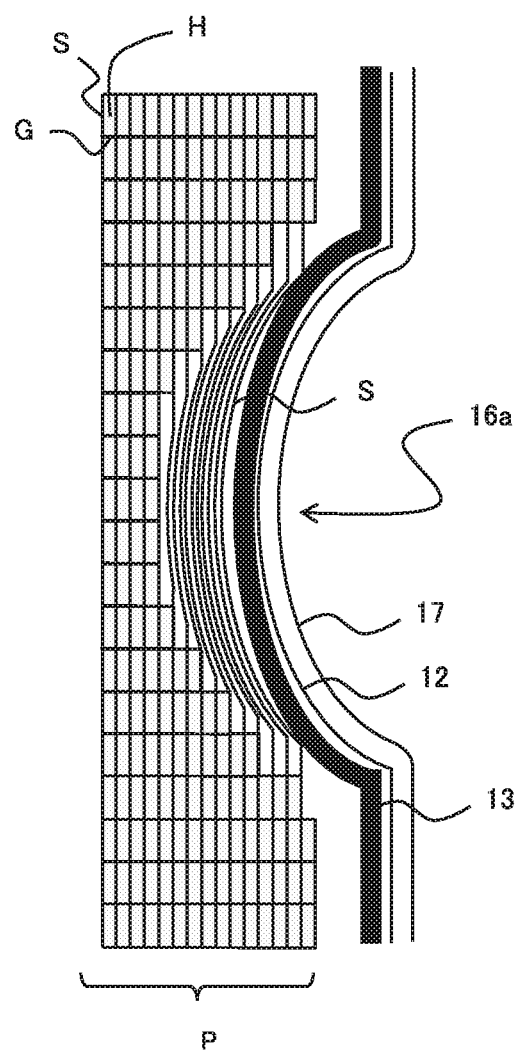
FIG. 12 is an enlarged view of a portion around the deformed part 16a illustrated in FIG. 10.

FIG. 12 is an enlarged view of a portion around the deformed part 16a illustrated in FIG. 10. FIG. 12 illustrates an exemplary configuration of the display panel 12 in the vicinities of the deformed part 16. In the example illustrated in FIG. 12, the display region P of the display panel 12 is in a shape of the display device 1, that is, a shape having a recess along the outer shape of the case 17. The end of the display panel 12, in the deformed part 16a, is formed with an inward recess along the inward recess of the case 17. In other words, the outer shape of the display panel 12 (in a strict sense, the outer shape of the glass substrate composing the display panel 12) is recessed inward along the recess of the deformed part 16a.

The display panel 12 includes a plurality of source lines S (also referred to as data lines, or signal lines) that extend in one direction (in the vertical direction in the drawing), and a plurality of gate lines G (also referred to as control lines) that extend in a direction that crosses the source lines S (in the horizontal direction in the drawing). At points corresponding to points of intersection between the source lines S and the gate lines G, pixels H are arranged, respectively. In the deformed part 16a, the source lines S are displaced inward so as to be arranged along the inward recess of the display panel 12. The gate lines G are shortened in the deformed part 16a in accordance with the recess of the display panel 12.

Thus, in the deformed part 16a, in the inward recess of the display panel 12, there exist source lines S that do not intersect with the gate lines G. In the area of these source lines S, no pixel is formed. By decreasing the line intervals of the source lines S that do not intersect with the gate lines G, the frame width of the display device 1 can be narrowed. Thus, by decreasing the distance between the display region P and the deformed part 16a of the transparent cover 16, which allows an operation to be performed by touching with a finger, the user operability can be improved.

Modification Example

FIGS. 13, 14, 15, and 16 are transparent plan views that illustrate modification examples of the display device 1 illustrated in FIGS. 9 and 10. In FIGS. 13 to 16, the outer shape of the display panel 12 is indicated by broken lines, and the outer shape of the touch panel 14 is indicated by solid lines. Further, the position of the deformed part 16a of the outer peripheral line 16ut of the top surface 16 of the transparent cover 16 is indicated by dotted lines. In each of the examples illustrated in FIGS. 13 to 16, the display panel 12 is formed in a rectangular shape. The touch panel 14 has a shape along the outer shape of the case 17. The shapes of the deformed part 16a illustrated in FIGS. 13 to 16 can be applied to Embodiment 1 described above and Embodiments 3, 4 described below.

Figure 13:
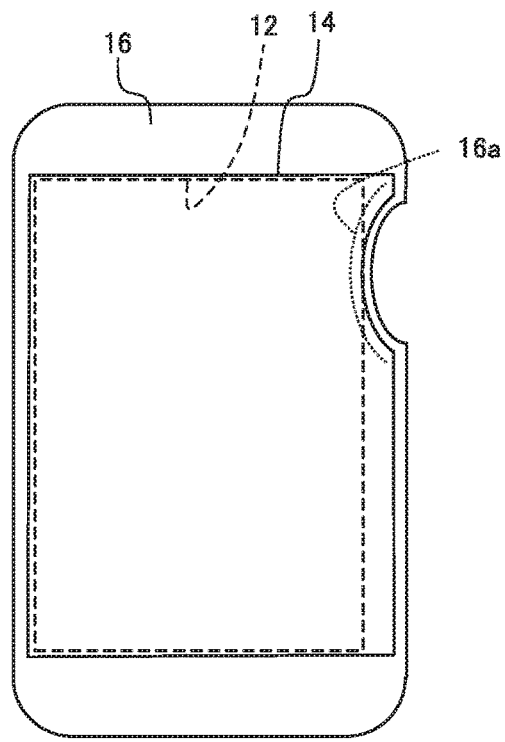
FIG. 13 is a transparent plan view illustrating a modification example of the display device 1 illustrated in FIGS. 9 and 10.

In the example illustrated in FIG. 13, the recess of the deformed part 16a is formed in a inwardly curved shape when viewed in a direction vertical to the display surface. The recess of the touch panel 14 and the case 17 is also formed in curved shapes along the curve of the recess of the deformed part 16a. In this way, the portion corresponding to the deformed part 16a of the end face of the display device 1 is formed with a curved surface, which makes the user's operation feeling in sliding the finger along the deformed part 16a natural.

Figure 14:
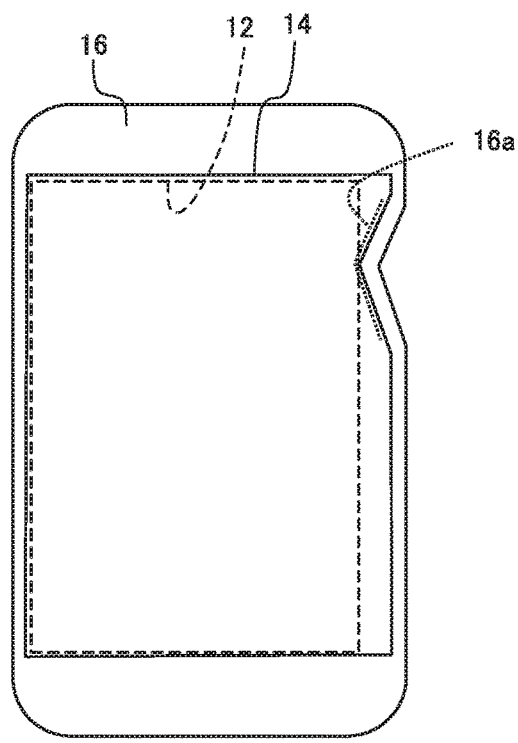
FIG. 14 is a transparent plan view illustrating a modification example of the display device 1 illustrated in FIGS. 9 and 10.
Figure 15:
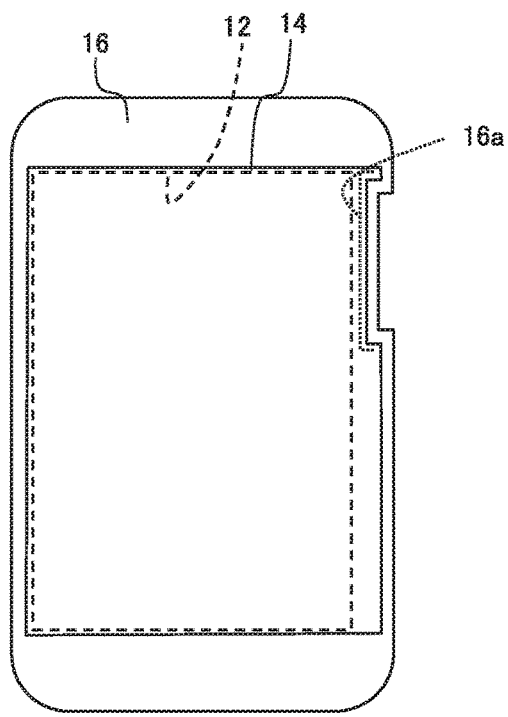
FIG. 15 is a transparent plan view illustrating a modification example of the display device 1 illustrated in FIGS. 9 and 10.

In the example illustrated in FIG. 14, the recess of the deformed part 16a is in a triangular shape when viewed in a direction vertical to the display surface. The recess of the touch panel 14 and the case 17 is also in a triangular shape along the recess of the deformed part 16a. In the example illustrated in FIG. 15, the recess of the deformed part 16a is in a rectangular shape. The recess of the touch panel 14 and the case 17 is also in a rectangular shape along the recess of the deformed part 16a. In the examples illustrated in FIGS. 14 and 15, the portion of the end face of the display device 1 corresponding to the deformed part 16a can be formed with flat surfaces.

Figure 16:
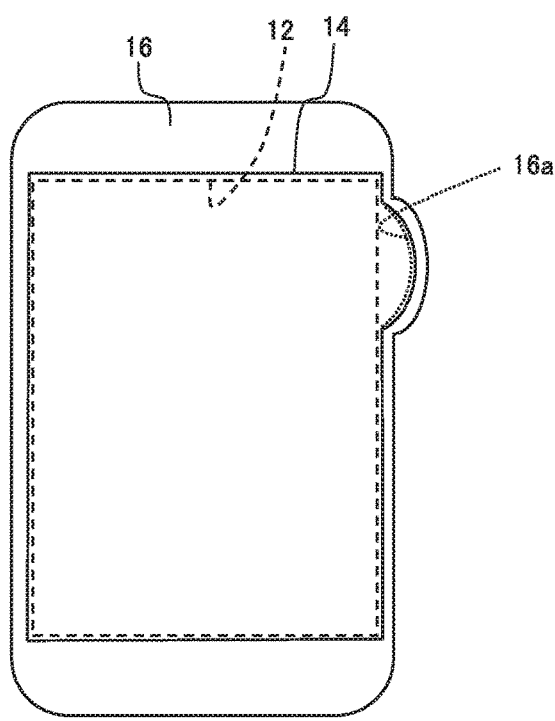
FIG. 16 is a transparent plan view illustrating a modification example of the display device 1 illustrated in FIGS. 9 and 10.

FIG. 16 illustrates an example in a case where the end of the transparent cover 16 is protruded outward so as to form the deformed part 16a. In this example, the touch panel 14 and the case 17 are also protruded outward along the deformed part 16a.

Embodiment 3

Figure 17:
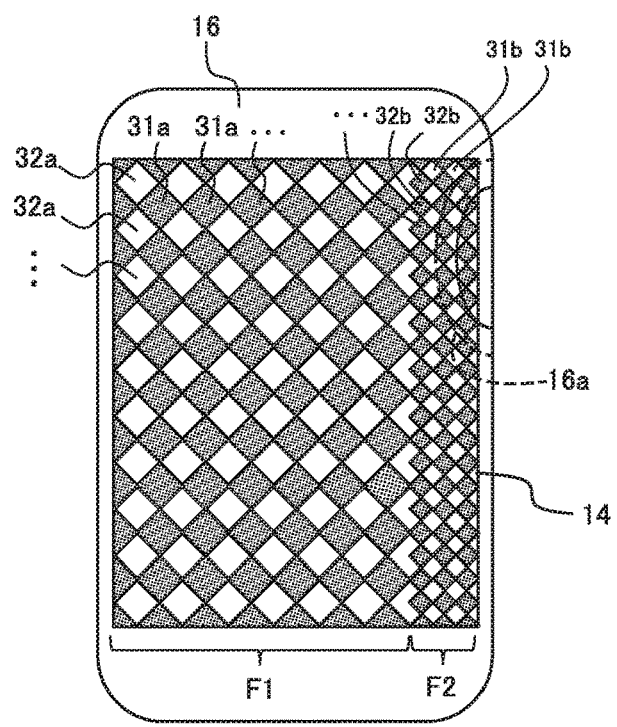
FIG. 17 is a transparent plan view of a display device 1 according to Embodiment 3.

FIG. 17 is a transparent plan view of the display device 1 according to Embodiment 3. FIG. 17 schematically illustrates the configuration of electrode groups of the transparent cover 16 and the touch panel 14 when viewed in a direction vertical to the display surface. In FIG. 17, the position of the deformed part 16a of the outer peripheral line 16ut of the top surface 16 of the transparent cover 16 is indicated by dotted lines. Configurations other than the configuration according to Embodiment 2 described below may be identical to Embodiment 1, Embodiment 2, or the combination of these.

In the example illustrated in FIG. 17, the touch panel 14 includes a plurality of first electrode pads 31a, 31b arrayed in one direction (in the horizontal direction in the drawing in the present example), and a plurality of second electrode pads 32a, 32b arrayed in a direction different from the foregoing direction (in the vertical direction in the drawing in the present example). The first electrode pads 31a and the second electrode pads 32a are arranged so as to be adjacent to each other. In FIG. 17, the illustration of clearances between the first electrode pads 31a and the second electrode pads 32a is omitted. Actually, the first electrode pad 31a and the second electrode pad 32a that are adjacent to each other are not electrically connected, and are insulated from each other. The first electrode pads 31a, 31b and the second electrode pads 32a, 32b are arranged at such position that the same overlap the transparent cover 16 when viewed in a direction vertical to the display surface. The touch panel 14 detects capacitances between the first electrode pads 31a and the second electrode pads 32a, thereby sensing contact or approach of an object with respect to the transparent cover 16.

In the example illustrated in FIG. 17, the shape and the pitch of the first electrode pads 31b and the second electrode pads 32b in an area F2 that is formed along the edge where the deformed part 16a is formed are different from those of the first electrode pads 31a and the second electrode pads 32a in an area F1 that is an area other than the area F2. More specifically, the size and the pitch of the first electrode pads 31b and the second electrode pads 32b in the area F2 are respectively smaller than the size and the pitch of the first electrode pads 31a and the second electrode pads 32a in the area F1.

Figure 18:
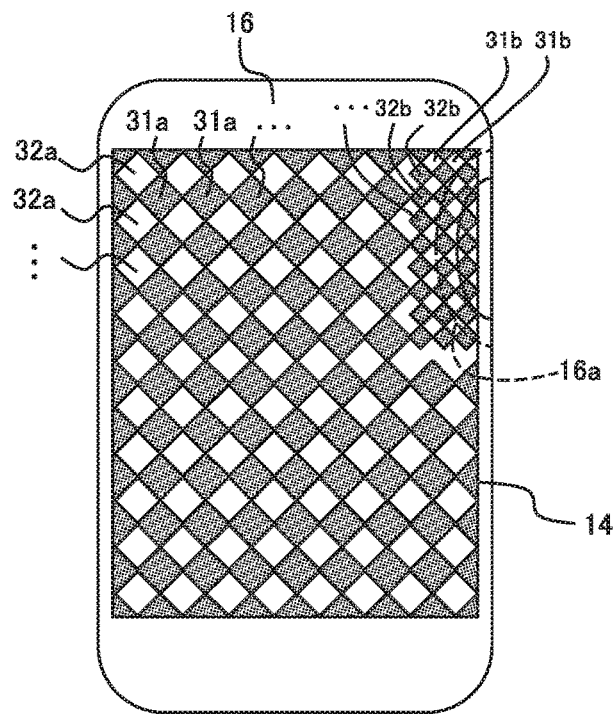
FIG. 18 is a transparent plan view of a modification example of the display device 1 illustrated in FIG. 17.

FIG. 18 is a transparent plan view illustrating a modification example of the display device 1 illustrated in FIG. 17. In the example illustrated in FIG. 18, in an area along a part of one of the four edges of the outer periphery of the touch panel 14 where the deformed part 16a is provided (the left edge in the drawing), the configurations of the electrode pads 31, 32 are different from those in the other area. In other words, in the part overlapping the deformed part 16a, in the area along the left edge of the touch panel 14, the configurations of the electrode pads 31, 32 are different from those in the other area.

Figure 19:
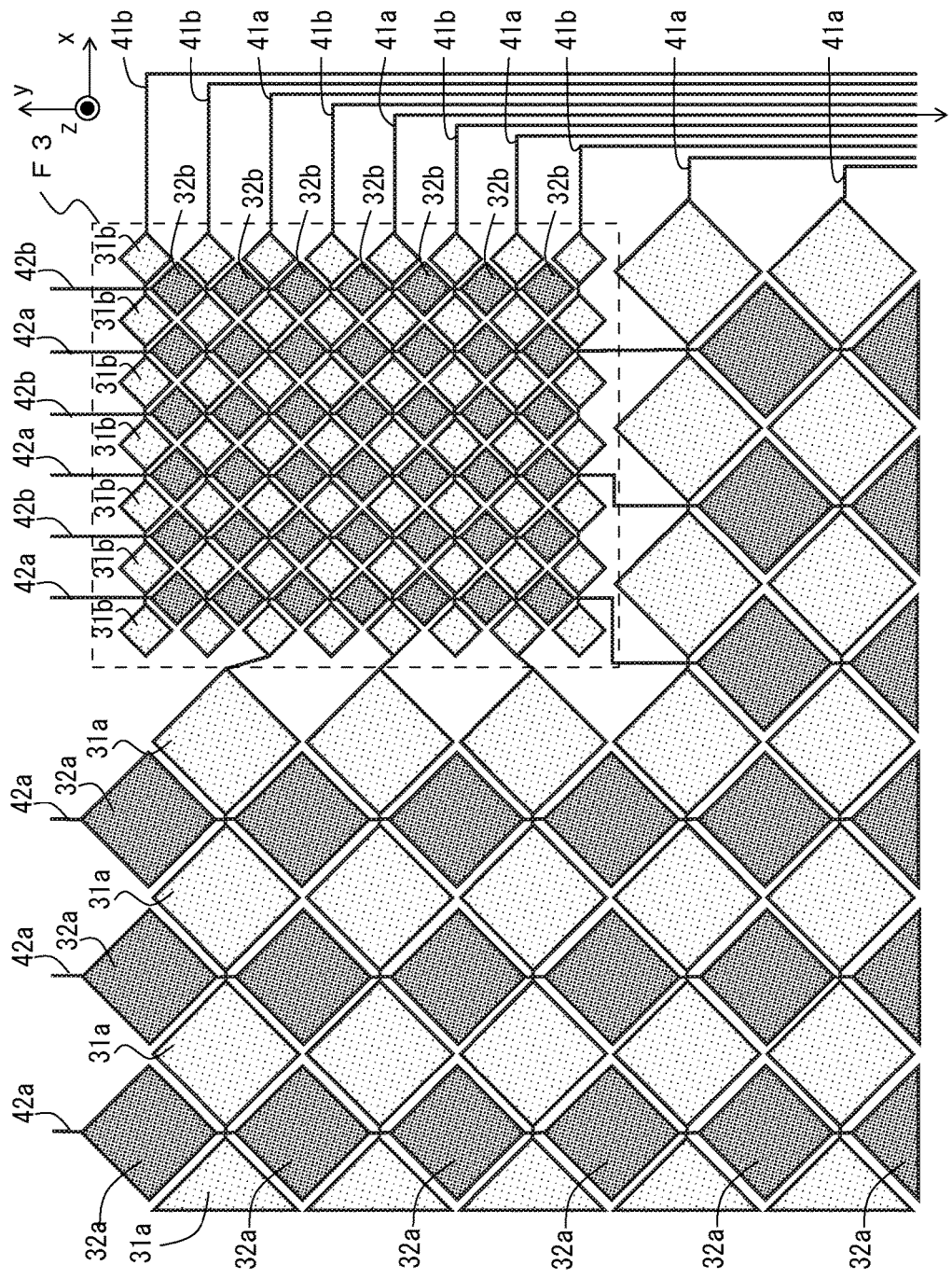
FIG. 19 illustrates a detailed exemplary configuration of electrode pads 31, 32 that are different in size and pitch.

FIG. 19 illustrates detailed exemplary configurations of the electrode pads 31, 32 that are different in the size and the pitch. In the example illustrated in FIG. 19, a plurality of electrode pads 31a, 31b, 32a, 32b that are in a rectangular shape each are arranged in matrix having rows and columns. A plurality of first electrode pads 31a, 31b arrayed in the x direction compose rows. A plurality of second electrode pads 32a, 32b arrayed in the y direction compose columns. The electrode pads 31a, 31b in each row are connected and led to outside (not illustrated) of the display region P by first lines 41a, 41b. The second electrode pads 32a, 32b in each column are connected and led to outside of the display region P by second lines 42a, 42b.

The row interval and the column interval of matrix formed with the electrode pads 31b, 32b in area F3 are different from the row interval and column interval of matrix formed with the electrode pads 31a, 32b in the other area. More specifically, the size and the pitch of the electrode pads 31b, 32b in the area F3 are respectively smaller than the size and the pitch of the electrode pads 31a, 32a in the other area. The intervals of the lines 41a, 41b, 42a, 42b in the area F3, therefore, are smaller than the intervals of the lines 41a, 42a in the other area, whereby the density of the same is high.

A part of the first lines 41a, 41b arranged continuously in the area F3 (one per two lines in the present example) are extension lines of the first lines 41a in the other area. Similarly, a part of the second lines 42a, 42b arranged continuously in the area F3 (one per two lines in the present example) are extension lines of the second lines 42a of the other area.

In this way, by making the shape or the pitch of the electrode pads in the area including the deformed part 16a and those in the other area different, respective electrode pad configurations can be made suitable for the sensing of contact or approach of an object, in the area including the deformed part 16a and in the other area. For example, in the deformed part 16a, the electrode pads can be configured so that a fine motion of a user's finger can be detected, and at the same time, in the other area where an image is displayed, the electrode pads can be configured so that, before a user's finger is in contact with the transparent cover 16, approach of the same closer than a certain set distance can be sensed.

Figure 20A:
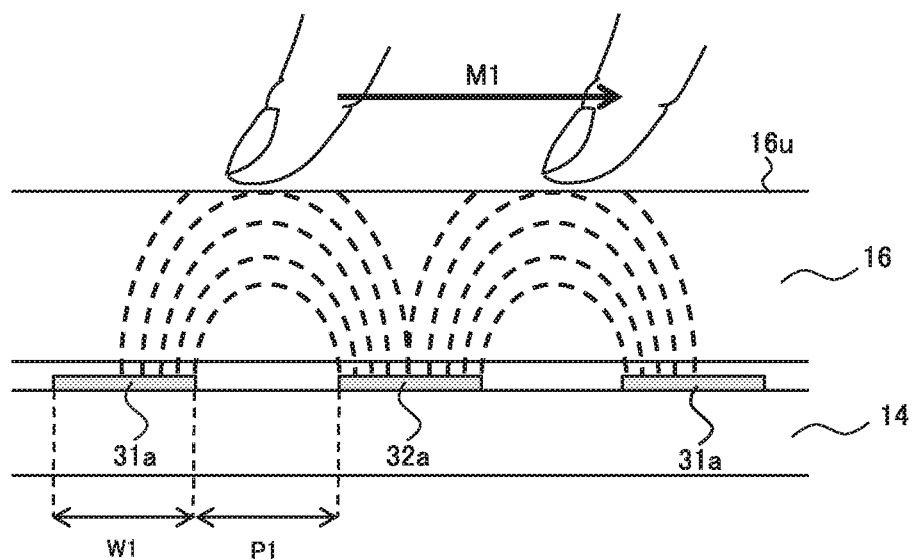
FIG. 20A illustrates one example of a scene where a motion of a finger on a transparent cover 16 is sensed.

The following description describes the effects of this. FIG. 20A illustrates an exemplary scene where a motion of a finger on the transparent cover 16 is sensed. In the example illustrated in FIG. 20A, the touch panel 14 recognizes the presence of a finger by detecting capacitances between adjacent electrode pads 31a, 32a. If, therefore, the distance of a movement M1 of the finger is about a sum of the distance P1 between adjacent electrode pads 31a, 32a on the top surface 16u of the transparent cover 16, and the width W1 of the electrode pad, i.e., (P1+W1), which is the pitch, the motion of the finger is sensed. In other words, a motion of a finger over a distance equal to or smaller than P1+W1 cannot be detected in some cases.

Figure 20B:
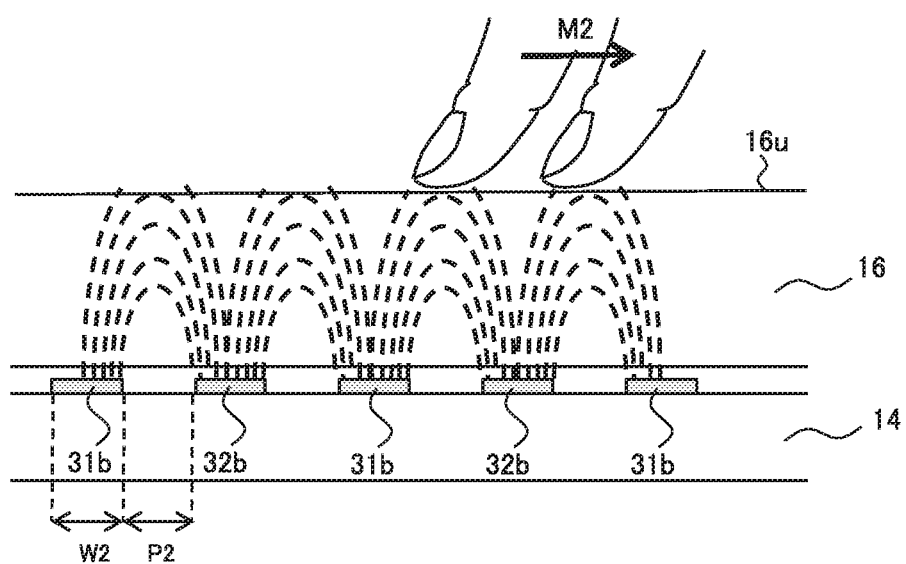
FIG. 20B illustrates an example in a case where a width W2 of electrode pads 31b, 32b and a distance P2 between the electrode pads 31b, 32b are shorter than those in the example illustrated in FIG. 20A.

FIG. 20B illustrates an exemplary case where the width W2 of the electrode pads 31b, 32b and the distance P2 between the electrode pads 31b, 32b are smaller than those in the example illustrated in FIG. 20A. In this case, a movement M2 of the finger that is shorter than the movement in FIG. 20A can be detected. In this way, when the pitch of the electrode pads 31, 32 is decreased, a finer motion of the finger can be detected. On the other hand, when the pitch of the electrode pads 31, 32 is greater, the sensable distance tends to be longer. For example, the detectable distance in the direction vertical to the surface on which the electrode pads 31, 32 are formed is greater in the configuration illustrated in FIG. 20A than that in the configuration illustrated in FIG. 20B. In other words, as the pitch is greater, the sensitivity in the thickness direction of the transparent cover 16 tends to improve.

Figure 21:
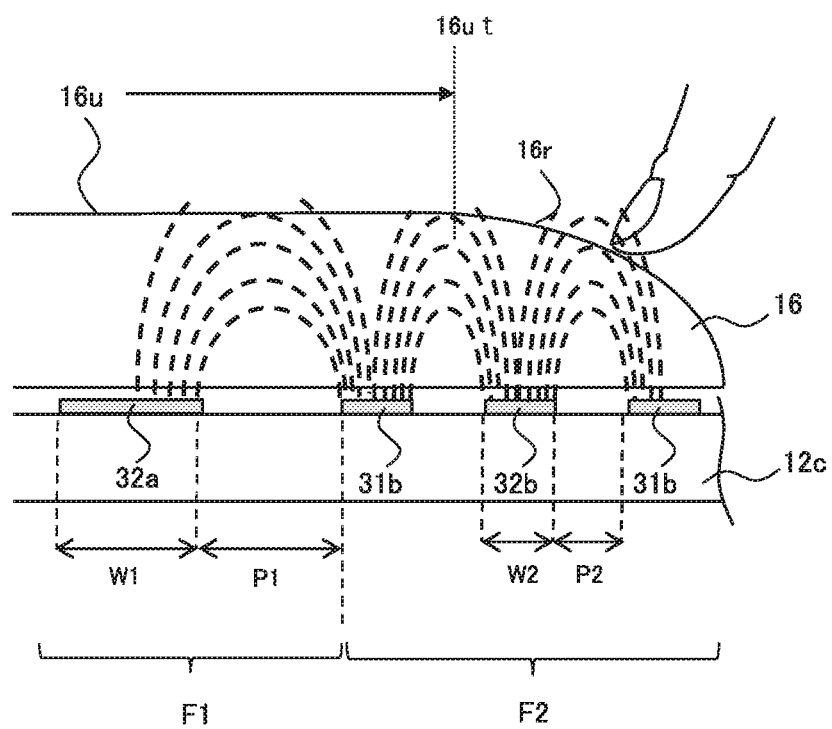
FIG. 21 is a cross-sectional view of vicinities of a deformed part 16a in the display device 1 illustrated in FIGS. 17 and 18.

FIG. 21 is a cross-sectional view illustrating the vicinities of the deformed part 16a of the display device 1 illustrated in FIG. 17 or 18. In the example illustrated in FIG. 21, the pitch (W2+P2) of the electrode pads 31, 32 in an area F2 at a certain distance from the right end of the transparent cover 16 is smaller than the pitch (W1+P1) in an area F1 that is on an inner side with respect to the area F2. For example, W1 and P1 may be set to 5 mm, while W2 and P2 may be set to 1 mm.

The boundary between the top surface 16u and the side surface 16r of the transparent cover 16, that is, the outer peripheral line 16ut, is within the area F2. On the outer peripheral line 16ut and the side surface 16r on an outer side with respect to the outer peripheral line 16ut, therefore, object motion sensing accuracy is higher than that in the center part of the top surface 16u. In other words, a fine motion of a user's finger coming into contact with the vicinities of the outer peripheral line 16ut can be detected.

On the other hand, in the vicinities of the outer peripheral line 16ut and on an outer side of the same, the sensable distance decreases, whereby the sensitivity in the thickness direction decreases. In this portion, however, the thickness of the transparent cover 16 is also small, and the influences of the decrease of the sensitivity in the thickness direction are small.

In the portion of the top surface 16u, the transparent cover 16 has a greater thickness as compared with the thickness thereof in the portion of the side surface 16r. In the area F1, which is an inner area of the top surface 16u, therefore, the design is such that the pitch of the electrode pads 31, 32 is greater. This makes it possible to increase the sensitivity in the thickness direction, in the area of the top surface 16u with a greater thickness.

Embodiment 4

Figure 22:
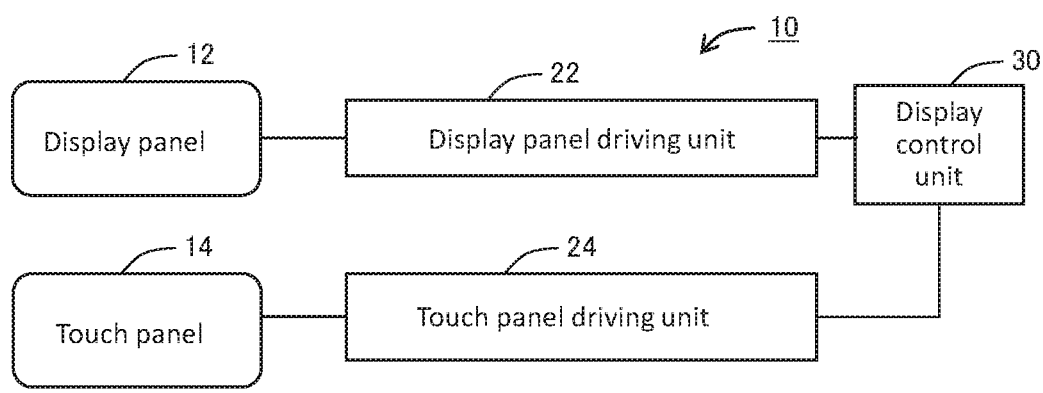
FIG. 22 is a functional block diagram illustrating an exemplary configuration of a display device 1 according to Embodiment 4.

FIG. 22 is a functional block diagram illustrating an exemplary configuration of a display device 1 according to Embodiment 4. In the example illustrated in FIG. 22, the display device 1 includes a display panel 12, a display panel driving unit 22, a touch panel 14, a touch panel driving unit 24, and a display control unit 30. The display panel 12 may have the same configuration as that of the display panel 12 according to any one of Embodiments 1 to 3. The touch panel 14 may have the same configuration as that of the touch panel 14 according to any one of Embodiments 1 to 3 described above or a configuration of a modification example described below.

The display panel driving unit 22 may be a source driver and a gate driver that supply signals to the source lines and the gate lines of the display panel 12, respectively. The touch panel driving unit 24 may be a touch panel controller (TP controller) that controls the detection electrodes and the drive electrodes of the touch panel 14. These display panel driving unit 22 and touch panel driving unit 24 can be formed with, for example, semiconductor chips (not illustrated) provided on a flexible printed circuit (FPC, not illustrated) connected to the panel.

The display control unit 30 controls images displayed on the display panel 12 based on contact or approach of an object sensed by the touch panel 14. The display control unit 30 acquires position information of the object from the touch panel 14, decides an image to be displayed based on the position information of the object, and outputs image data to the display panel 12. The display control unit 30 can be formed with, for example, a processor exclusively for image processing, CPU, or a combination of these.

Figure 23A:
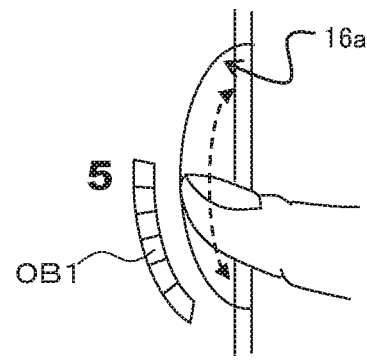
Figure 23B:
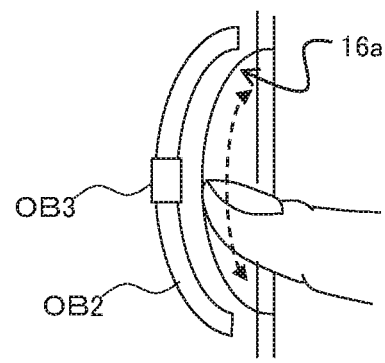
Figure 23C:
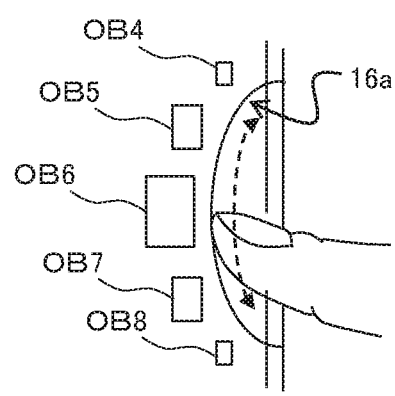

The display control unit 30 causes an image according to contact or approach of an object sensed at the deformed part 16a of the transparent cover 16 to be displayed on a portion of the display region P corresponding to the deformed part 16a. FIGS. 23A, 23B, and 23C illustrate display examples of images according to contact of the finger sensed at the deformed part 16a.

In the example illustrated in FIG. 23A, an image object OB1 in a shape along a curve of a recess on an end of the transparent cover 16 in the deformed part 16a is displayed. This image object OB1 can represent, for example, volume such as output volume or screen brightness of the display device 1. Together with the image object OB1, a value of volume, "5", is also displayed. Further, the display may be such that the size of the object OB1 and the value of volume can be changed according to the amount of the movement of the finger in the recess on the end of the transparent cover 16. This allows a user to adjust the volume by an action of sliding the finger along the deformed part 16a of the transparent cover 16.

In this case, the display control unit 30 can decide the direction and amount of a motion of an object along the outer peripheral line 16ut of the top surface 16u or the side surface 16r of the transparent cover 16 in the deformed part 16a, based on position information sensed by the touch panel 14. The display control unit 30 determines whether the volume is increased or decreased according to the direction of the motion of the object, and determines the amount of change of the volume according to the amount of the motion of the object. Based on the result of this determination, the display control unit 30 updates the image object OB1, and causes the display device 1 to perform an operation of changing the volume.

In the example illustrated in FIG. 23B, an image object OB2 in a shape along a curve of a recess on an end of the transparent cover 16 in the deformed part 16a is displayed. An image object OB3 is displayed as moving over the image object OB2 according to the position of the finger. These image objects OB2, OB3 can be displayed as, for example, a scroll bar of the screen. In other words, when a user moves the finger along the shape of the deformed part 16a, the screen can be scrolled in a direction in which the finger has moved, for an amount corresponding to the amount of the movement of the finger. Thus, a user can scroll the screen by sliding the finger over the deformed part 16a of the transparent cover 16.

In this case as well, the display control unit 30 can decide the direction of a movement of an object and the amount of the movement thereof on the deformed part 16a, based on position information sensed by the touch panel 14. Then, the display control unit 30 determines the direction in which the screen is scrolled, according to the direction of the movement of the object, and determines the amount of scrolling, according to the amount of the movement of the object. The display control unit 30 updates the image objects OB2, OB3, and scrolls the screen, based on the determination results.

In the example illustrated in FIG. 23C, a plurality of image objects OB4 to OB8 are displayed along the recess of the end of the transparent cover 16 at the deformed part 16a. The respective display modes of the image objects OB4 to OB8 can be changed according to the position of the finger in the deformed part 16a. For example, an image object that is positioned closest to the finger can be displayed in a focus mode. The focus mode can be a display mode in a case where an image object is displayed in distinction from the normal display state. For example, a selection state display mode indicating that an image object such as an icon is in a state of being selected by a user is one example of the focus mode.

In the example illustrated in FIG. 23C, the image object OB6 closest to the position of the finger is displayed in the greatest size, that is, in the focus mode. Further, the image objects are displayed in such a manner that the sizes of the image objects are adjusted according to the distances from a position of a finger. Such display of the image objects OB4 to OB8 can be used for an operation of selecting a content object such as a file, a page, and a folder. For example, only sliding a finger along the deformed part 16a of the transparent cover 16 so as to select an image object (select, for example, a file), and tapping the same in the selected state, a user can indicate an action relating to the image object (for example, indicate an action of opening the file).

In this case, the display control unit 30 can decide a position and an action of an object in the deformed part 16a, based on the position information sensed by the touch panel 14. Then, the display control unit 30 can determine an image object and an action to be selected according to the position and the action of the object. The display control unit 30 updates the image objects OB4 to OB8 based on this determination results, and at the same time causes the display device 1 to execute the action.

As in the example illustrated in the above-described FIGS. 23A to 23C, it is possible to display an image object in a shape along the shape of the deformed part 16a, or display image objects arranged along the shape of the deformed part 16a. Further, the image object display mode can be controlled, or a corresponding processing operation can be executed, according to at least one of the position, the movement direction, the amount of the movement, the movement speed, or the action of the object in the deformed part 16a. It should be noted that in the case of the example illustrated in the above-described FIGS. 23A to 23C, electrodes of the touch panel in the deformed part 16a can be formed finely. This makes it possible to detect a fine motion of a finger in the deformed part 16a, thereby improving the operability.

Figure 24:
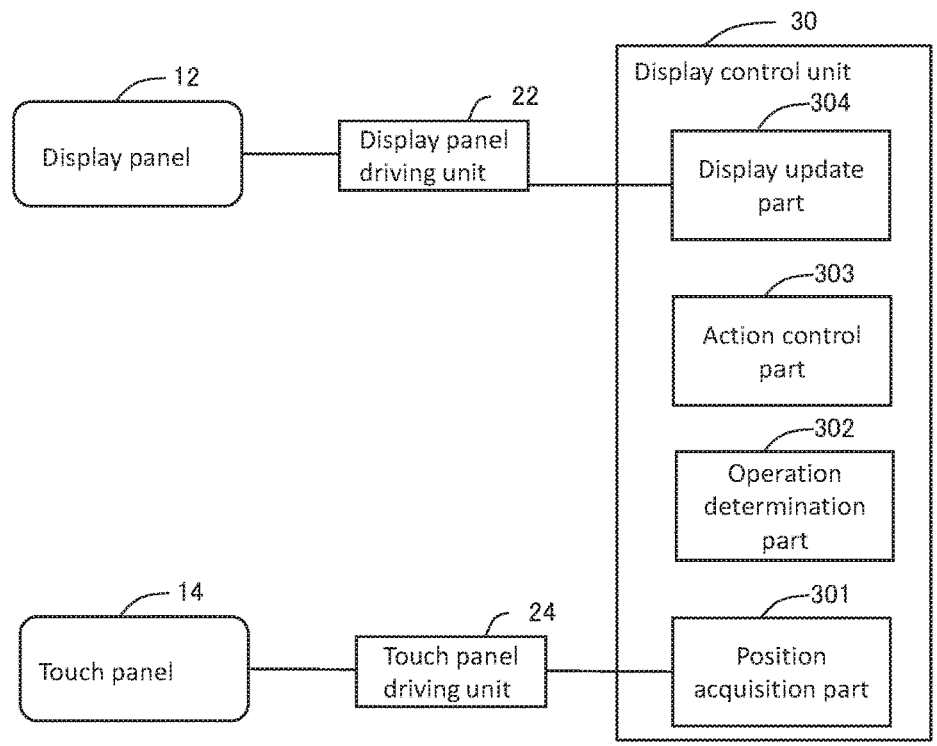
FIG. 24 is a functional block diagram illustrating an exemplary configuration of a display control unit 30.

In order to realize such a user interface as that in the above-described example illustrated in FIGS. 23A to 23C, the display control unit 30 can be formed as described below. FIG. 24 is a functional block diagram illustrating an exemplary configuration of the display control unit 30. In the example illustrated in FIG. 24, the display control unit 30 includes a position acquisition part 301, an operation determination part 302, an action control part 303, and a display update part 304.

The position acquisition part 301 acquires position information of an object detected by the touch panel 14, from the touch panel 14. The position acquisition part 301, for example, receives sensing signals that indicate changes in the capacitances of the electrodes under detection, from the touch panel driving unit 24, thereby acquiring position information of an object.

The operation determination part 302 determines presence/absence of an operation with respect to the deformed part 16a based on the position information that the position acquisition part 301 has acquired. For example, in a case where position information of an object indicates a position in the area of the deformed part 16a, it can be determined that there is an operation with respect to the deformed part 16a. The data indicating the area of the deformed part 16a may be recorded preliminarily, or alternatively, the data can be obtained by the touch panel 14 recognizing the shape of the deformed part 16a.

Using the position information acquired by the position acquisition part 301, the operation determination part 302 decides an operation with respect to the deformed part 16a by using the position information of the object. For example, the operation determination part 302 decides at least one of the position, the movement direction, the amount of the movement, the movement speed, or the operation of object in the deformed part 16a, as an operation of the deformed part 16a. Examples of the types of the action include a tapping operation, a tapping operation with respect to a plurality of portions, and a sliding operation, and the type is not limited to a specific one.

The action control part 303 controls the action of the display device 1 according to the operation decided by the determination part 302. For example, the action control part 303 can cause the display device 1 to execute an action corresponding to the operation decided by the operation determination part 302. The action control part 303, for example, can decide an action by referring to data that associate operations and actions.

The display update part 304 updates an image to be displayed, according to the operation decided by the determination part 302. For example, the display update part 304 can update the display mode of an image object displayed at a position corresponding to the deformed part 16a, according to the operation.

The configuration of the display control unit 30 is not limited to the example illustrated in FIG. 24. For example, the action control part 303 may be omitted from the configuration. Further, a program that causes a computer to function as a display device including the position acquisition part 301, the operation determination part 302, and the display update part 304, which are described above, and a non-transitory recording medium that records such a program, are also encompassed by embodiments of the present invention.

Figure 25:
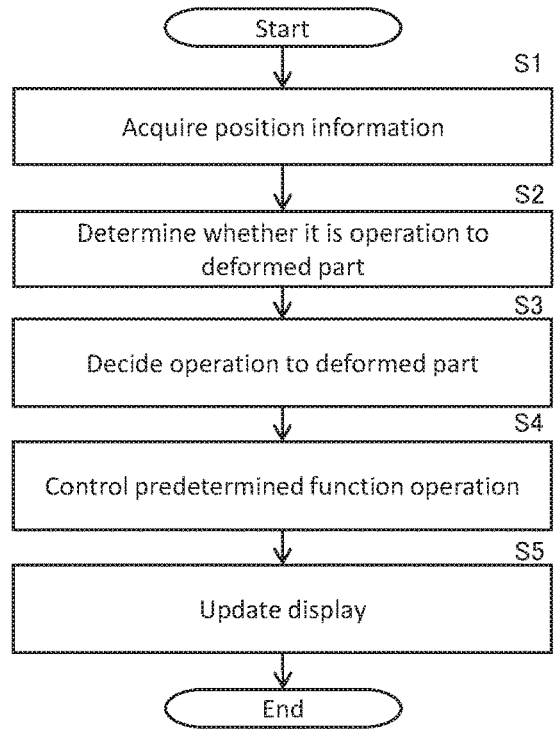
FIG. 25 is a flowchart illustrating exemplary actions of a display control unit 30 illustrated in FIG. 24.

FIG. 25 is a flowchart illustrating an exemplary action by the display control unit 30 illustrated in FIG. 24. In the example illustrated in FIG. 25, when the touch panel 14 senses contact or approach of a finger or the like, the position acquisition part 301 acquires position information of the finger (S1). The operation determination part 302 decides presence/absence of an operation with respect to the deformed part 16a (S2). When an operation with respect to the deformed part 16a is determined to be performed, the operation determination part 302 determines what operation is performed with respect to the deformed part 16a (S3). The action control part 303 performs a predetermined function operation control according to the determination results (S4). The display update part 304 performs image display control with respect to the display panel 12 according to the determination results (S5).

Depending on the shape of the deformed part 16a, the range of an operation by a user is limited to some extent. In the above-described action example, therefore, a processing operation for recognizing the operation with respect to the deformed part 16a is made simple and accurate. Further, for a user, the operated portion is easy to find, and it is unlikely that an input error is made. For example, a user can accurately perform an intended operation, without gazing the display screen. In an extreme case, this might make it possible to allow a user to perform an intended operation with respect to the display device 1 remaining in a pocket, by putting a hand into the pocket, without looking at the display device 1.

Modification Example of Deformed Part 16a

The deformed part 16a can be formed with, not a part of the outer peripheral line 16ut of the top surface 16u of the transparent cover 16, but an inner peripheral line provided on an inner side with respect to the outer peripheral line 16ut.

Figure 26:
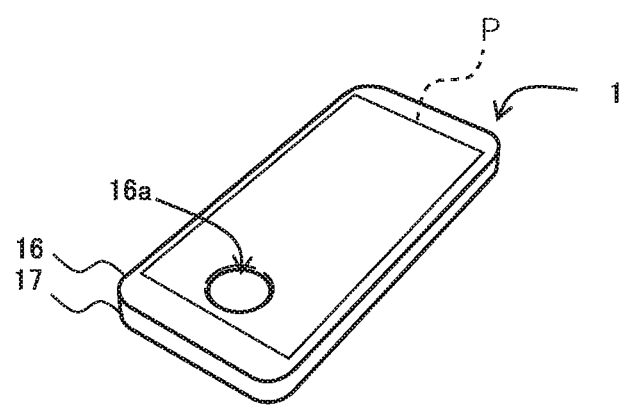
FIG. 26 illustrates an exemplary configuration in a case where there is provided a deformed part 16a that is formed by an inner periphery of a top surface 16u.
Figure 27:
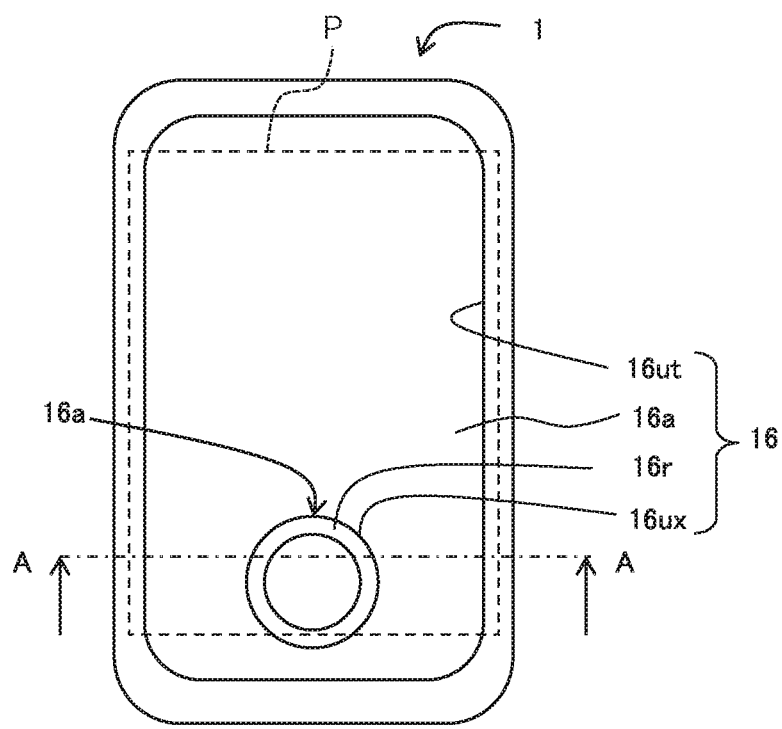
FIG. 27 is a plan view of the display device 1 illustrated in FIG. 26.
Figure 28:
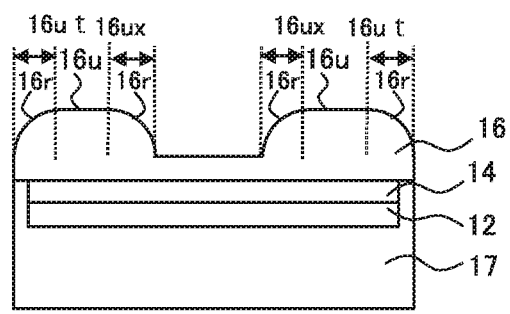
FIG. 28 is a cross-sectional view of the display device 1 illustrated in FIG. 27 taken along line A-A.
Figure 29:
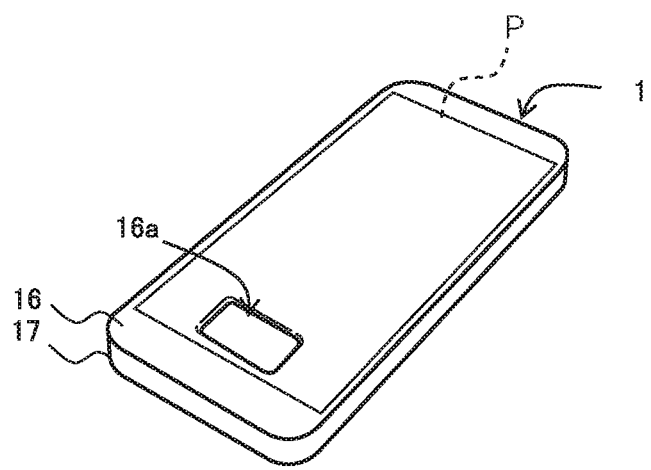
FIG. 29 illustrates a modification example of the display device illustrated in FIG. 26.
Figure 30:
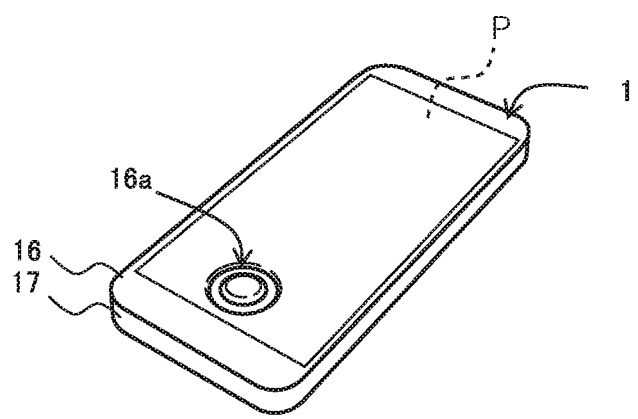
FIG. 30 illustrates a modification example of the display device illustrated in FIG. 26.
Figure 31:
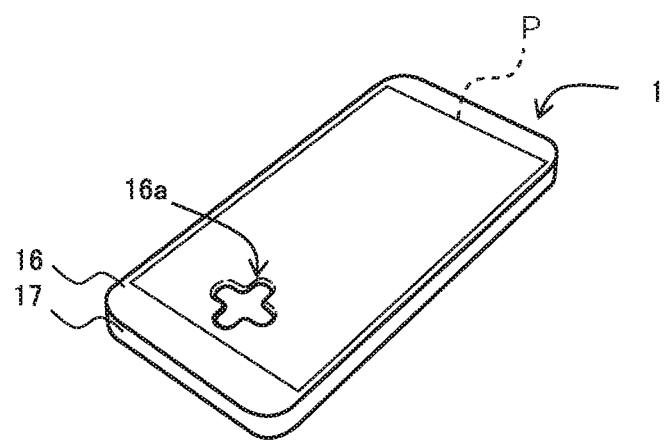
FIG. 31 illustrates a modification example of the display device illustrated in FIG. 26.
Figure 32:
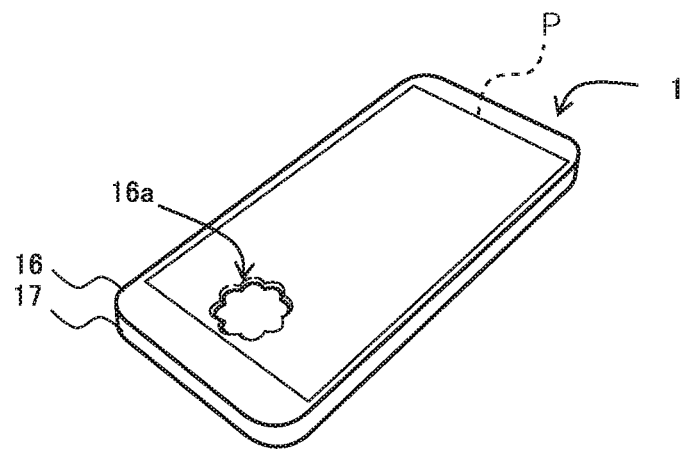
FIG. 32 illustrates a modification example of the display device illustrated in FIG. 26.

FIG. 26 illustrates an exemplary configuration in a case a deformed part 16a formed with an inner peripheral portion of the top surface 16u is provided in the center part of the transparent cover 16. FIG. 27 is a plan view of the display device 1 illustrated in FIG. 26. FIG. 28 is a cross-sectional view of the display device 1 illustrated in FIG. 27, taken along line A-A. The transparent cover 16 includes a top surface 16u parallel to an image display surface, and side surfaces 16r that are connected to the top surface 16u. The side surfaces 16r are surfaces that are not parallel to the top surface. The side surfaces 16r is provided also on an inner side with respect to the outer peripheral line 16ut of the top surface 16u. The inner peripheral line 16ux on the inner side to the outer peripheral line 16ut of the top surface 16u serves as the deformed part 16a. Here, the inner peripheral line 16ux is a boundary line between the top surface 16u and the side surface 16r.

In the example illustrated in FIGS. 26 to 28, in the center part of the transparent cover 16, the surface of the transparent cover 16 is recessed in a direction vertical to the image display surface. In other words, a recessed portion whose edge is the deformed part 16a, which is the inner peripheral line 16ux of the top surface 16u, is formed. In this example, in an area inside the deformed part 16a, the thickness of the transparent cover 16 is thinner, as compared with the thickness in the area of the top surface 16u. The deformed part 16a is formed in a circular shape when viewed in the direction vertical to the display surface.

The configuration of the deformed part 16a is not limited to the recessed portion. For example, the configuration may be such that, in the deformed part 16a, the surface of the transparent cover 16 protrudes in the direction vertical to the display surface. Alternatively, an opening (hole) provided on an inner side to the outer peripheral line of the top surface 16u of the transparent cover 16 may be used as the deformed part 16a. Further, as is the case with Embodiment 2 described above, the outer shape of the display device 1 may be formed along a shape of the deformed part 16a of the transparent cover 16. For example, the configuration may be such that, on an inner side to the outer peripheral line of the top surface 16u of the transparent cover 16, a hole that passes through the display device 1 is provided, and this hole is used as the deformed part 16a.

In the example illustrated in FIGS. 26 to 28, the deformed part 16a is provided at a position that overlaps the display region P as viewed in the direction vertical to the display surface. This makes it possible to sense contact or approach of an object in the deformed part 16a, with use of the electrodes of the touch panel 14 provided at positions overlapping the display region P.

FIGS. 29 to 32 illustrate modification examples of the display device illustrated in FIG. 26. In the example illustrated in FIG. 29, the deformed part 16a is formed in a rectangular shape. In the example illustrated in FIG. 30, the deformed part 16a has such a configuration that in a circular recessed portion, a protruded part is formed in a circular shape having a radius smaller than that of the recessed portion. With this shape, an action of accurately moving an object is made easier, with use of the circle formed by the deformed part 16a. In the example illustrated in FIG. 31, the deformed part 16a is formed in a cruciform shape. In the example illustrated in FIG. 30, the deformed part 16a is formed in a flower shape. This improves the aesthetic quality of the display device 1.

Figure 33:
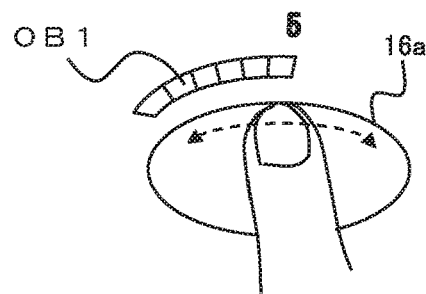
FIG. 33 illustrates an exemplary display in a case where the exemplary image display illustrated in FIG. 23A is applied to the display device illustrated in FIGS. 26 to 28.
Figure 34:
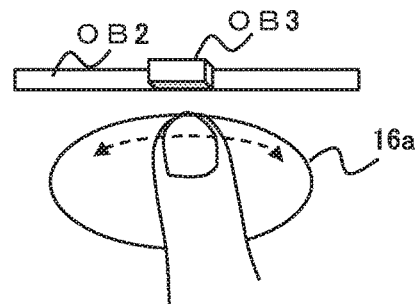
FIG. 34 illustrates an exemplary display in a case where the exemplary image display illustrated in FIG. 23B is applied to the display device illustrated in FIGS. 26 to 28.
Figure 35:
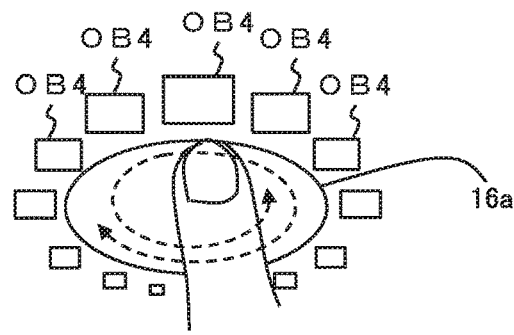
FIG. 35 illustrates an exemplary display in a case where the exemplary image display illustrated in FIG. 23C is applied to the display device illustrated in FIGS. 26 to 28.

FIGS. 33, 34, and 35 illustrate display examples in cases where the image display examples illustrated in FIGS. 23A, 23B, and 23C are applied to the display devices 1 illustrated in FIGS. 26 to 28, respectively. In the example illustrated in FIG. 33, an image object OB1 in a shape along a part of the circle of the deformed part 16a is displayed. In the example illustrated in FIG. 34, an image object OB2 in a shape along a part of the circle of the deformed part 16a, and an image object OB3 that moves over the image object OB2 according to a movement of a finger, are displayed. In the example illustrated in FIG. 35, a plurality of image objects OB4 to OB8 are displayed along a part of the circle of the deformed part 16a.

Figure 36:
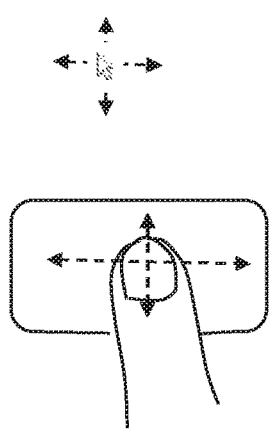

FIG. 36 illustrates an example in a case where the position of a cursor is changed according to a motion of an object in an inner area of the deformed part 16*a*. In the example illustrated in FIG. 36, the display control unit 30 is capable of updating the position of the cursor displayed outside the deformed part 16*a*, according to the movement direction and the movement distance of a user's finger sensed in the inner area of the deformed part 16*a*. An image corresponding to the motion of the finger may be displayed in the inner area of the deformed part 16*a*.

The configuration as described above in which the deformed part 16*a* is formed with the inner peripheral line 16*ux* provided on an inner side to the outer peripheral line 16*ut* of the top surface 16*u* can be applied to, for example, Embodiment 3 described above.

So far, the embodiments of the present invention are described, but the embodiment of the present invention is not limited to Embodiments 1 to 4 described above. For example, in the above descriptions of the embodiments, cases where the present invention is applied to a projection-type electrostatic touch panel equipped display module are described. The touch panel, however, is not limited to the electrostatic capacitance type. The present invention can be applied to touch panels of the resistance film type and other types in which a non-detectable position could occur. Further, the display panel is not limited to a liquid crystal panel. The display panel may be, for example, an organic EL display, a plasma display, or a display in which electrophoresis or MEMS is used.

Embodiments of the present invention encompass various types of electronic equipment including the display devices according to the above-described embodiments. For example, the display device of the present invention can be applied to smartphones, mobile phones, tablet terminals, game machines, general-purpose computers, remote controllers for various types of equipment, digital cameras, video cameras, on-vehicle panels, car navigation systems, television apparatuses, ATM, electronic bulletin boards, electronic guideboards, electronic whiteboards, and the like. Such various types of electronic equipment, if the display device 1 according to Embodiments 1 to 4 is mounted thereof, are allowed to include touch panels provided with user interfaces suitable for the purposes of the electronic equipment. This therefore improves the operability of the electronic equipment.

DESCRIPTION OF REFERENCE NUMERALS

1 Display device
12 Display panel
14 Touch panel
16 Transparent cover
16*a* Deformed part
17 Case
30 Display control unit
P Display region

The invention claimed is:

1. A display device comprising:
  a display panel including a display region that displays an image;
  a transparent cover superposed on the display region, the transparent cover including a top surface parallel to a surface that displays the image, and a side surface connected to the top surface;
  a touch panel that senses contact or approach of an object with respect to the transparent cover; and
  a case that houses the display panel and the touch panel, wherein
  the touch panel is capable of sensing contact or approach of an object at at least a portion of an outer peripheral line that is a boundary line between the top surface and the side surface in the outer periphery of the top surface of the transparent cover,
  at the portion of the outer peripheral line of the transparent cover, at which contact or approach of an object can be sensed by the touch panel, a portion of the outer peripheral line that is recessed inward or is protruded outward in a planar view is a deformed portion,
  a portion of the case corresponding to the deformed portion of the transparent cover is recessed inward or protruded outward along a shape of the deformed portion, and
  a shape of the case is the same as a shape of the transparent cover in a planar view.

2. The display device according to claim 1,
  wherein the touch panel includes a plurality of first electrodes and a plurality of second electrodes that are provided to be superposed on the transparent cover, and senses contact or approach of an object with respect to the transparent cover by detecting capacitances between the first electrodes and the second electrodes, and
  a shape or a pitch of the first electrodes and the second electrodes that sense contact or approach of an object in the deformed portion is different from a shape or a pitch of the first electrodes and the second electrodes in another portion.

3. The display device according to claim 1, further comprising:
  a display controller that controls an image displayed on the display panel, based on the contact or approach of the object sensed by the touch panel, wherein
  the display controller allows an image corresponding to the contact or approach of the object sensed at the deformed portion of the transparent cover to be displayed at a portion of the display region corresponding to the deformed portion of the display region.

4. The display device according to claim 1,
  wherein the side surface of the transparent cover has a curved surface.

5. The display device according to claim 1,
  wherein the transparent cover is removable.

6. The display device according to claim 5,
  wherein, when the transparent cover is attached, the touch panel detects the attachment of the transparent cover and a position of the deformed portion.

7. The display device according to claim 1,
  wherein the deformed portion is provided at only one portion of the outer periphery of the top surface of the transparent cover.

8. The display device according to claim 1, wherein
  the touch panel includes a plurality of first electrodes and a plurality of second electrodes that are provided to be superposed on the transparent cover, and senses contact or approach of an object with respect to the transparent cover by detecting capacitances between the first electrodes and the second electrodes; and
  the display device further includes a display controller that controls an image displayed on the display panel, based on the contact or approach of the object sensed by the touch panel, and
  the display controller allows an image corresponding to the contact or approach of the object sensed at the deformed portion of the transparent cover to be displayed at a portion of the display region corresponding to the deformed portion.

9. Electronic equipment comprising the display device according to claim 1.

10. The display device according to claim 1, wherein the display panel further includes a plurality of source lines that extend in one direction and a plurality of gate lines that extend in another direction that cross the source lines;

an end of the display panel in the deformed portion is provided with an inward recess, in a planar view, along an outer shape of the case;

the source lines are displaced inward to be arranged along the inward recess of the display panel; and ones of the gate lines adjacent to the inward recess of the display panel are shortened with respect to other ones of the gate lines which are not adjacent to the inward recess of the display panel.

* * * * *